US008457671B2

(12) United States Patent
Slemmer et al.

(10) Patent No.: US 8,457,671 B2
(45) Date of Patent: *Jun. 4, 2013

(54) DEVICE FOR AGGREGATING, TRANSLATING, AND DISSEMINATING COMMUNICATIONS WITHIN A MULTIPLE DEVICE ENVIRONMENT

(75) Inventors: John B. Slemmer, Dunwoody, GA (US); Stefan Olsson, Birmingham, AL (US); Barrett Kreiner, Norcross, GA (US); Andre Jarboe, Stone Mountain, GA (US); Kevin Kleinfelter, Atlanta, GA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 581 days.

This patent is subject to a terminal disclaimer.

(21) Appl. No.: 12/628,141

(22) Filed: Nov. 30, 2009

(65) Prior Publication Data

US 2010/0075702 A1    Mar. 25, 2010

Related U.S. Application Data

(63) Continuation of application No. 11/232,642, filed on Sep. 22, 2005, now Pat. No. 7,626,952, which is a continuation of application No. 10/914,710, filed on Aug. 6, 2004, now Pat. No. 6,985,450, which is a continuation of application No. 10/175,482, filed on Jun. 18, 2002, now Pat. No. 6,795,404.

(51) Int. Cl.
*G06F 15/16* (2006.01)
*G08B 23/00* (2006.01)
*G08B 1/08* (2006.01)

(52) U.S. Cl.
USPC ............................ 455/500; 370/270; 370/243

(58) Field of Classification Search
USPC ................. 455/500; 709/200, 204–206, 230, 709/245, 246; 340/500, 539.14, 539.17, 539.19, 340/313; 370/270, 243
See application file for complete search history.

(56) References Cited

U.S. PATENT DOCUMENTS

| 6,546,419 | B1 * | 4/2003 | Humpleman et al. | 709/223 |
|---|---|---|---|---|
| 6,675,384 | B1 * | 1/2004 | Block et al. | 725/28 |
| 6,795,404 | B2 * | 9/2004 | Slemmer et al. | 370/270 |
| 6,889,207 | B2 * | 5/2005 | Slemmer et al. | 705/54 |
| 6,985,450 | B2 * | 1/2006 | Slemmer et al. | 370/270 |
| 7,114,167 | B2 * | 9/2006 | Slemmer et al. | 758/28 |
| 7,412,505 | B2 * | 8/2008 | Slemmer et al. | 709/223 |
| 7,626,952 | B2 * | 12/2009 | Slemmer et al. | 370/270 |
| 7,849,181 | B2 * | 12/2010 | Slemmer et al. | 709/223 |
| 2001/0049275 | A1 * | 12/2001 | Pierry et al. | 455/414 |
| 2002/0151992 | A1 * | 10/2002 | Hoffberg et al. | 700/83 |
| 2003/0046689 | A1 * | 3/2003 | Gaos | 725/34 |

(Continued)

*Primary Examiner* — Bobbak Safaipour
(74) *Attorney, Agent, or Firm* — Scott P. Zimmerman, PLLC

(57) ABSTRACT

Aggregator devices and methods are disclosed for establishing device interaction in an environment containing other electronic devices and the aggregator device. The aggregator device has a transmitter, receiver, memory storing interaction rules, and a processor for implementing the interaction rules in association with the transmitter, receiver, and other devices of the environment. The methods involve transmitting a message to the aggregator from a first device, referencing rules of device interaction for the environment, and then according to the rules of device interaction, transmitting a message from the aggregator to a second device. The rules of device interaction may include instructions that are to be transmitted from the aggregator in response to the aggregator receiving change of state messages from devices of the environment.

19 Claims, 16 Drawing Sheets

U.S. PATENT DOCUMENTS

2003/0204639 A1* 10/2003 Lake et al. .................... 709/310
2012/0167134 A1* 6/2012 Hendricks et al. .............. 725/32
2012/0290659 A1* 11/2012 Rao et al. ...................... 709/204

* cited by examiner

DEVICE FOR AGGREGATING, TRANSLATING, AND DISSEMINATING COMMUNICATIONS WITHIN A MULTIPLE DEVICE ENVIRONMENT

CROSS REFERENCE TO RELATED APPLICATION

This application is a continuation of U.S. patent application Ser. No. 11/232,642, filed Sep. 22, 2005, now U.S. Pat. No. 7,626,952; which is a continuation of U.S. patent application Ser. No. 10/914,710, filed Aug. 6, 2004, now U.S. Pat. No. 6,985,450; which is a continuation of U.S. patent application Ser. No. 10/175,482, filed Jun. 18, 2002, now U.S. Pat. No. 6,795,404, the contents of all of which are incorporated by reference herein in their entirety.

TECHNICAL FIELD

The present invention relates to electronic device interactions. More specifically, the present invention relates to an aggregator of device interaction for an environment.

BACKGROUND

Electronic devices such as household appliances, audio-video equipment, computers, and telephones operate within a given environment such as the home of a user. However, these devices function independently of one another. The user must initiate actions on the devices to cause the devices to change to a particular state of operation to thereby perform a function desired by the user.

Often, the state of one or more of the electronic devices is related to the state of one or more other electronic devices within the same environment. For example, a user may be watching television (TV) when the telephone rings. The user wishes to answer the call, but to effectively communicate with the caller, the user must mute the television so that sound from the TV does not interfere with the telephone conversation. Every time a telephone call is to be answered while the user watches TV, the user must again repeat the muting process. For each call, once the user hangs up the phone, the TV must be manually unmuted so that the user can once again listen to the TV program being watched.

The TV-telephone scenario discussed above is only one example. There is an undeterminable number of scenarios and devices involved within a given environment. In each scenario, the devices do not communicate with one another and do not coordinate activities, and as a result the user is overly burdened. The number of electronic devices for a household is continually increasing, and the resulting burden on the user to manually coordinate states of the devices for given scenarios is increasing as well.

To address this problem, devices can be configured with communication abilities so that they can communicate with one another when one or more devices experience a user driven state change. However, when several devices are involved in the interaction, various complexities are introduced. As devices and associated interactions are added to the environment, communication paths begin to multiply non-linearly necessitating wider bandwidths to accommodate the increase. Interaction rules become ambiguous because devices down a chain of interaction cannot determine a proper state change due to several degrees of removal from the user driven event.

Additionally, many different transports are available for communication between devices. Absent a standard specifying a transport for an environment, any transport may be chosen as the transport for a particular device. If two devices are not equipped with the same transports, then communication between the devices becomes impossible. These devices will not satisfactorily coexist and interact in an environment.

Therefore, there is a need for aggregating communication paths, interactions, and/or message transports within a device environment to address these problems.

SUMMARY

Embodiments of the present invention address the problems discussed above through application of an aggregator to the device environment. An aggregator embodiment may be employed to act as a single point of communication between many devices thereby limiting the communication paths to the number of devices in the environment. An aggregator embodiment may also be employed to accept communications from multiple transport types to act as a translator between devices of different transports. An aggregator embodiment may also be employed to control device interaction by employing interaction rules.

An aggregator device embodiment includes at least one transmitter and at least one receiver. The embodiment also includes a memory that stores interaction rules for the plurality of devices of the environment. A processor in communication with the transmitter, receiver, and memory is also included. The processor is configured to receive a message from a first device through the at least one receiver, reference the interaction rules in relation to the message from the first device to direct communications through the at least one transmitter to one or more devices of the plurality.

The logical operations of the processor that involve implementing the interaction rules are embodied in methods. The methods specify how a particular device or group of devices communicate. One embodiment of a method involves transmitting a message to the aggregator from a first device and receiving the message at the aggregator. The aggregator references interaction rules in relation to the message from the first device to direct communications from the aggregator to one or more devices of the plurality.

Another embodiment of a method involves detecting a change of state at a first device and in response to detecting the change of state, transmitting a change of state message to the aggregator. The aggregator receives the change of state message and references interaction rules in relation to the change of state of the first device to determine a change of state instruction for a second device of the plurality. The aggregator then transmits the change of state instruction to the second device.

The various aspects of the present invention may be more clearly understood and appreciated from a review of the following detailed description of the disclosed embodiments and by reference to the drawings and claims.

DETAILED DESCRIPTION

Interaction among devices of an environment permit the devices to perform automatic changes of state without requiring the user to individually control each device. Through recognition of patterns of user behavior, interactive devices can associate the various user driven events from one device to the next to effectively create interaction rules. Application of these interaction rules allow the devices to implement the state changes automatically through communication of events between the devices.

Figure 1:
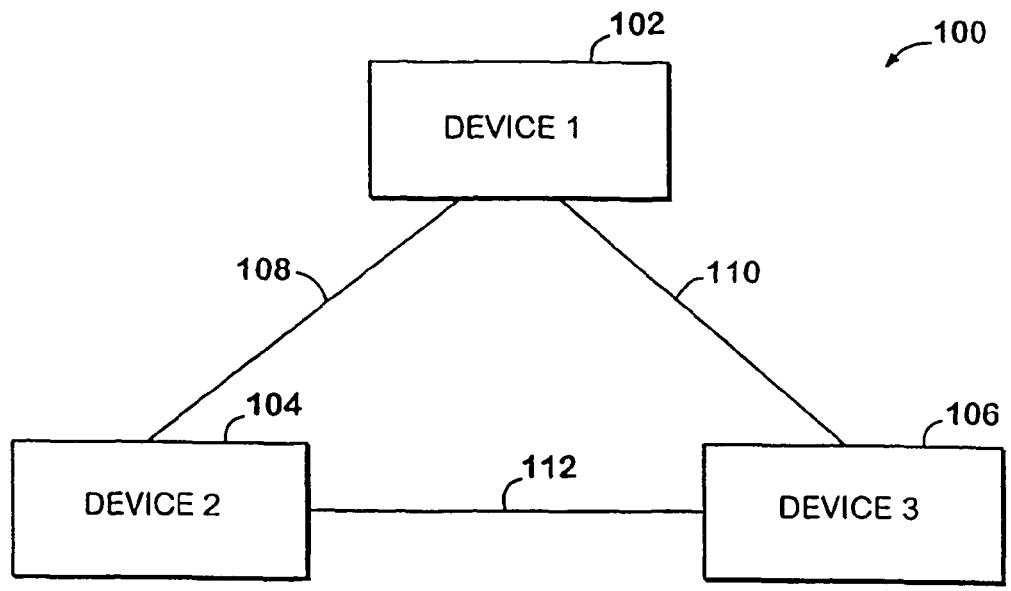
FIG. 1 is a diagram of a device environment.

A device environment is shown in FIG. 1 and is representative of a small area such as within a single household. However, a device environment may expand beyond a single area through networking of devices among various areas. This simplified device environment 100 shows three devices for exemplary purposes, but any number of devices may be present within a given environment 100. The devices of the environment 100 are devices that customarily appear within the particular type of environment. For example, in a household the devices would include but not be limited to typical household devices such as a television, VCR, DVD, stereo, toaster, microwave oven, stove, oven, washing machine, dryer, and telephone. These devices are adapted to become interactive as is discussed below.

Each device communicates with the other devices of the environment 100 in this example. A first device 102 communicates with a second device 104 through a bi-directional communication path 108. The first device 102 communicates with a third device 106 through a bi-directional communication path 110, and the second device 104 communicates with the third device 106 through a bi-directional communication path 112. The communication paths may be wired, wireless, or optical connections and may utilize any of the well-known physical transmission methods for communicating among devices in a relatively small relationship to one another.

The communication method used between two devices makes up a communication transport. For example, two devices may utilize the Bluetooth transport, standard infrared transport where line of sight is maintained, a UHF or VHF transport, and/or many others. Networked areas forming an environment can utilize LAN technology such as Ethernet, WAN technology such as frame relay, and the Internet. Multiple transports may be present in any single environment. As discussed below with reference to FIGS. 15 and 17, a particular device such as an aggregator may be equipped to translate messages from one communication transport to another. Aggregators are discussed generally and in more detail below.

Figure 2:
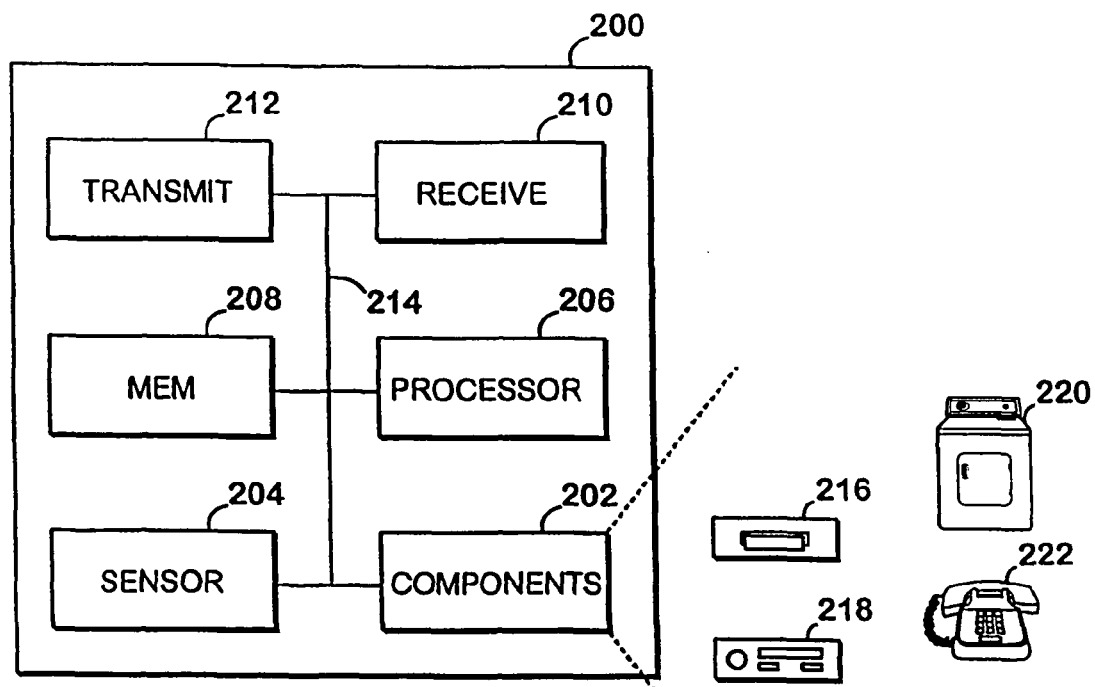
FIG. 2 is a diagram showing the major components of an embodiment of an interactive device.

The details of the devices 102, 104, and 106 are shown in more detail in FIG. 2. An interactive device 200 includes a processor 206 that communicates with various resources through a data bus 214. The processor 206 may execute software stored in a memory 208 or may utilize hardwired digital logic to perform logical operations discussed below to bring about the device interaction. The processor 206 communicates with the memory 208 to apply interaction rules that govern the communications. Interaction rules specify when a particular communication should occur, the recipients of the communication, and the information to be conveyed through the communication. Memory 208 may include electronic storage such as RAM and ROM, and/or magnetic or optical storage as well.

The processor 206 communicates with a transmitter 212 and a receiver 210 to physically communicate with the other devices of the environment. The transmitter and receiver pairs discussed herein for the various embodiments may be separate or incorporated as a transceiver. When an interaction rule specifies that a communication from device 200 should occur, the processor 206 controls the transmitter 212 to cause it to send a message. The message may take various forms discussed below depending upon the intended recipients. The receiver 210 receives messages directed to the device 200. The communications among devices may be configured so that each device to receive a message has identification data included in the message so that the processor 206 determines whether a message is relevant to the device 200 based on whether particular identification data is present.

Alternatively, other schemes may be used to communicate wherein a physical parameter of the receiver 210 controls whether a device 200 receives the message as one intended for it to be received. Examples of such physical parameters include the particular frequency at which a signal is transmitted, a particular time slot during which the message is transmitted, or the particular type of communication transport being used. The transmitter and receiver may be of various forms such as a modem, an Ethernet network card, a wireless transmitter and receiver, and/or any combination of the various forms.

The processor 206 also interacts with the intended functionality of the device 200. The device 200 includes components 202 that provide the unique function of the device 200. If the device 200 is a television 224, then the components 202 include the circuitry necessary to provide the television function. One skilled in the art will recognize that the processor 206 can be separate and distinct from the processing capabilities of the components 202 or alternatively, may be wholly or in-part incorporated into the processing capabilities of the components 202. The components 202 of many devices have digital logic such as an on-board processor of a television 224, CD player 216, stereo system 218, dryer 220, or telephone 222.

The processor 206 can control the operations of the components to cause state changes of the device 200. For example, the processor 206 can cause the channel to change on the television or cause the oven to preheat to a particular temperature. Thus, the processor 206 can reference interaction rules stored in memory 208 in relation to communications received through receiver 210 to determine whether a state change is necessary or can receive state change instructions through receiver 210 and implement the requested state change.

Additionally, the device 200 includes a sensor 204 for providing state change information to the processor 206 about the device 200. The sensor 204 may be either a physical sensor such as a transducer for detecting motion or a thermocouple for detecting temperature, or the sensor 204 may be a logical sensor. The logical sensor may be a programmed function of processor 206 or the processor of components 202 or may be hardwired logic. A logical sensor may be separate and distinct from the processor 206 and/or the digital logic of components 202 and communicate through the bus 214, or it may be incorporated wholly or in part in either the processor 206 of the processor of the components 202. The logical sensor 204 acts as an interface to the digital logic of the components 202 for detecting the logical state of a component, such as a particular input that is active on a stereo, or a particular channel being displayed on a television.

The processor 206 receives input from the sensor 204 to determine a current state of the components 202 and thereby determine when a change of state of the device 200 occurs. As discussed below, changes of state are used to learn interaction rules and implement the rules once they have been learned. Implementing interaction rules involves controlling changes of state at device 200 and/or transmitting change of state information about device 200 to other devices or transmitting change of state instructions to other devices.

Figure 3:
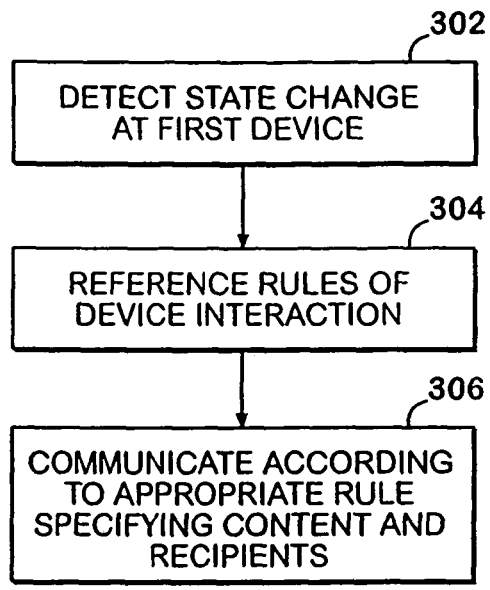
FIG. 3 is an exemplary operational flow of an interactive device communicating with other devices of the environment.

FIG. 3 shows the basic operational flow of the processor 206 for implementing device interaction to send a communication from device 200. A state change is detected at the device 200 as described above at detect operation 302 by the sensor 204. The state change may be a user driven event, such as a user turning the power on for the television, or an automatically occurring event such as an oven reaching a preheat temperature.

After detecting the change of state, the processor 206 references the rules of device interaction stored in the memory 208 to determine whether a communication is necessary, who should receive the communication, and the particular information to include at rule operation 304. The processor 206 performs a look-up of the state change that has been detected to find the interaction rule that is appropriate. The processor 206 then communicates according to the appropriate interaction rule by sending a message through transmitter 212 at communicate operation 306.

Figure 4:
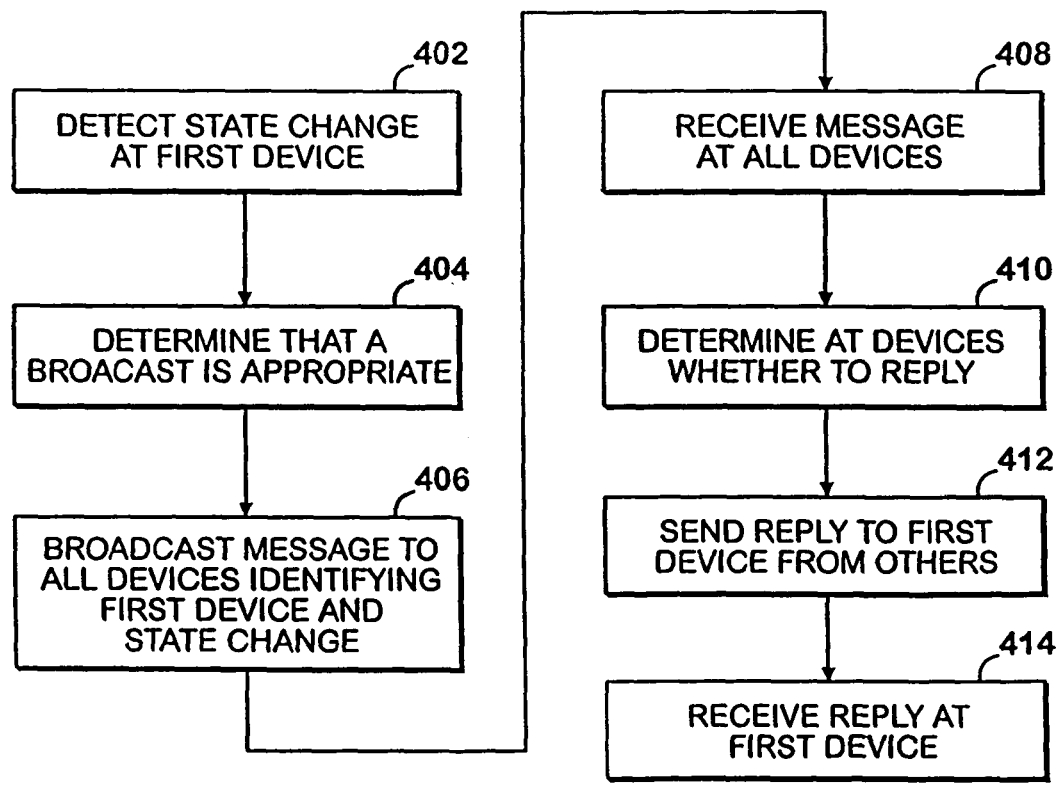
FIG. 4 is an exemplary operational flow of communication between interactive devices involving a message broadcast to all devices of the environment.

FIG. 4 shows an operational flow of a specific type of communication where a device 200 publishes its state change to all devices via a broadcast so that all devices receive the message. A broadcast to all devices is useful when devices are attempting to learn interaction rules by observing state change events occurring within the device environment 100 during a small interval of time.

The operational flow begins at detect operation 402 where the processor 206 realizes that sensor 204 has detected a change of state at device 200. The processor 206 then determines that a broadcast is appropriate at determine operation 404. The processor 206 may make this determination by referencing the rules of interaction to determine whether a broadcast is indicated. If learn modes are provided for the devices, as discussed below, then the processor 206 may recognize that it is operating within a learn mode where broadcasts of state change are required.

Once it is determined that a broadcast to all devices is appropriate, the processor 206 causes the broadcast to occur by triggering the transmitter 212 to send the message to all devices of the environment at broadcast operation 406. As discussed above, messages may be addressed to specific devices by manipulation of a transmission frequency, a time slot of the transmission, or by including recipient identification data in the transmission. The message contains an identification of the device 200 and the particular state change that has been detected.

The devices of the environment receive the message at receive operation 408. In this exemplary embodiment shown, the devices make a determination as to whether a reply is necessary at determine operation 410. Such a determination may be made by the devices by referencing their own interaction rules or determining that a learn mode is being implemented and a reply is necessary because they have also detected their own state change recently. When a reply is necessary, the one or more devices of the environment send a reply message addressed to the device 200 at send operation 412, and the device 200 receives the message through receiver 210 at receive operation 414.

Figure 5:
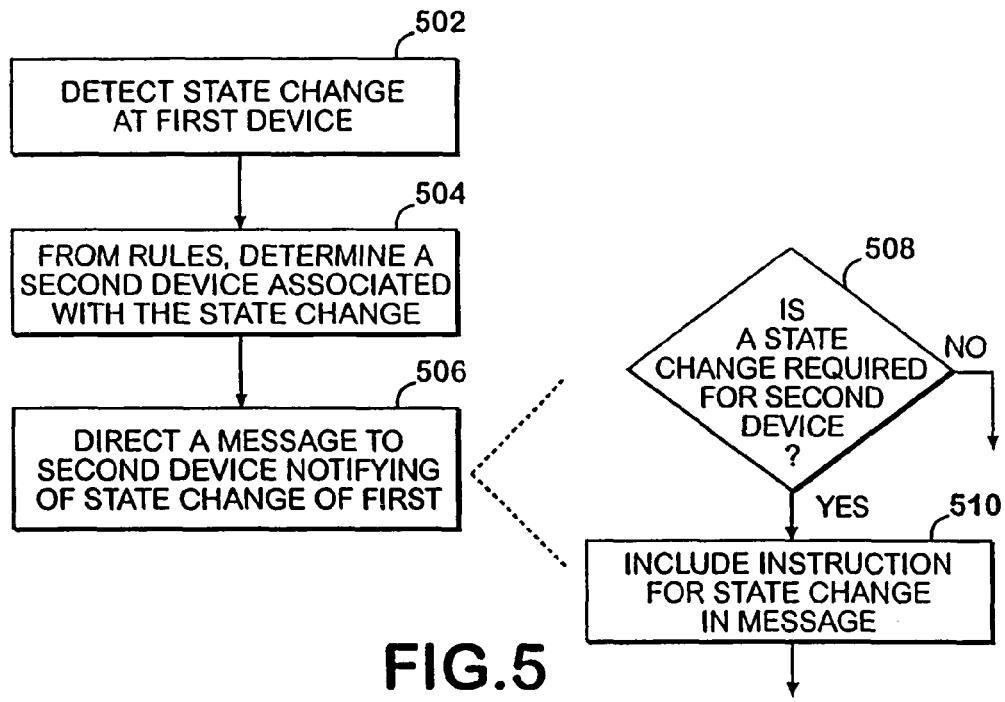
FIG. 5 is an exemplary operational flow of communication between interactive devices involving a message directed to a specific device of the environment.

FIG. 5 shows an operational flow where a message is directed to a specific device of the environment from the device 200. The processor 206 recognizes that the sensor 204 has detected a change of state of the device 200 at detect operation 502. The processor 206 then determines from the interaction rules that a second device is associated with the state change at determine operation 504. The second device may be a subscriber, which is a device that has noticed through a learning operation that it is related to the first device 200 through a particular state change event and that the first device should provide it an indication when the particular state change event occurs. Once it has been determined who should receive a message, the processor 206 triggers the transmitter 212 to direct a message to the second device at send operation 506, and the message includes a notification of the state change of the first device 200.

The processor 206 may employ additional logic when directing the message to the second device. The processor 206 may detect from the interaction rules in memory 208 whether the second device should change state in response to the detected change of state of the first device 200 at query operation 508. If so, then the processor 206 includes an instruction in the message to the second device at message operation 510 that specifies the change of state that should be automatically performed by the second device.

Figure 6:
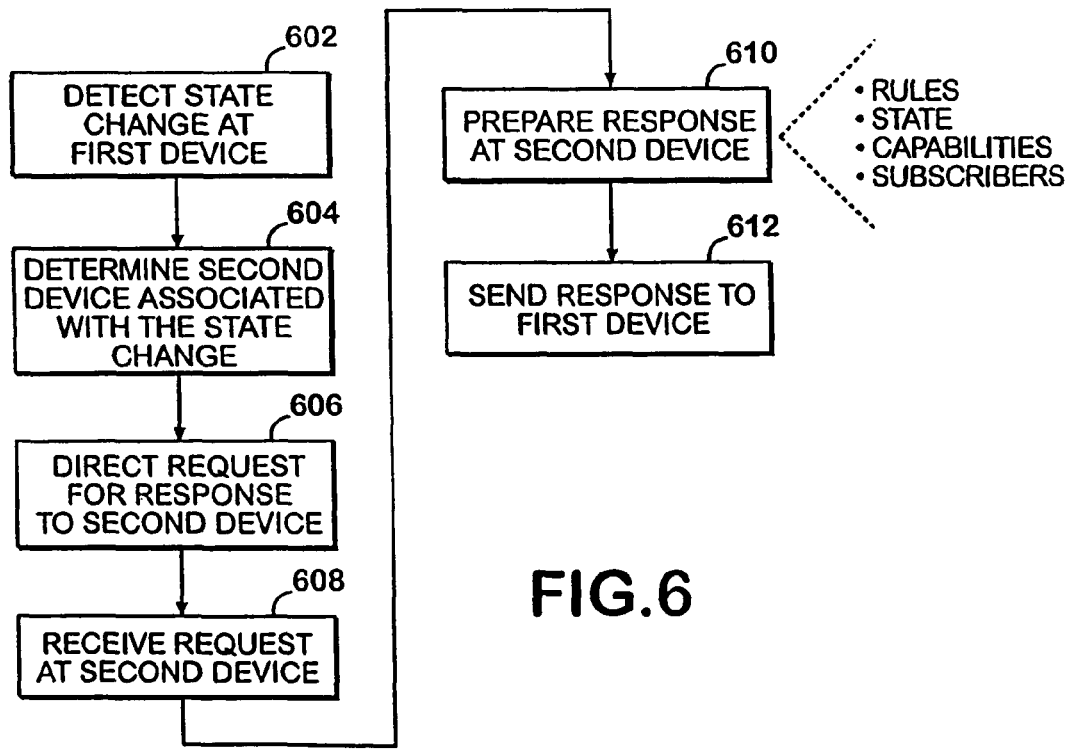
FIG. 6 is an exemplary operational flow of communication between interactive devices involving a request and a response to the request.

FIG. 6 shows an operational flow where a request is made and a response is thereafter provided. At detect operation 602, the processor 206 recognizes that the sensor 204 has detected a change of state of the device 200. The processor 206 then determines that a second device is associated with the state of change at determine operation 604. In this case, the processor 206 recognizes that a request to the second device is necessary, such as by reference to the interaction rules or due to some other reason such as a particular learn mode being implemented.

The processor 206 triggers the transmitter 212 to direct a request message to the second device at send operation 606. The request message can specify that the second device is to respond by transmitting particular data that the second device currently possesses in memory to the device 200. The second device receives the request message at receive operation 608. The second device prepares a response by obtaining the required information from its memory, sensor, or components. Such information includes interaction rules, its current state, its current capabilities, or those who have subscribed to it for state change events. Once the information is obtained, the second device sends the response including the information to the first device 200 at send operation 612.

Figure 7:
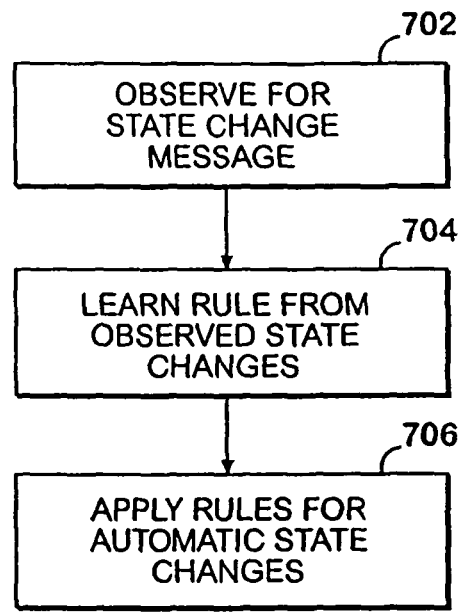
FIG. 7 is an exemplary operational flow of rule acquisition of an interactive device.

FIG. 7 is an operational flow of a learning process of the device 200. The device 200 may learn interaction rules that it obeys by observing activity in the environment in relation to its own state changes. Because the device may automatically learn interaction rules rather than requiring that they be manually programmed, a burden on the user is lessened. The operational flow begins by observing the environment to detect a state change message at observation operation 702. The state change message may originate from another device of the environment and is received through the transmitter 210. State changes of the device 200 that is learning the rule are also detected through its sensor 204.

After detecting state change messages, the processor 206 learns the rule at learn operation 704 by associating together state changes that have occurred over a small interval of time. For example, a user may turn on one device and then shortly thereafter manipulate another device, and these two state changes are observed and associated as a rule. Particular methods of learning are discussed in more detail below with reference to FIGS. 8 and 9. The processor 206 stores the rule in the memory 208 where it can be referenced for subsequent determinations of whether state changes should occur automatically. The rules are applied from the memory 208 at application operation 706.

Figure 8:
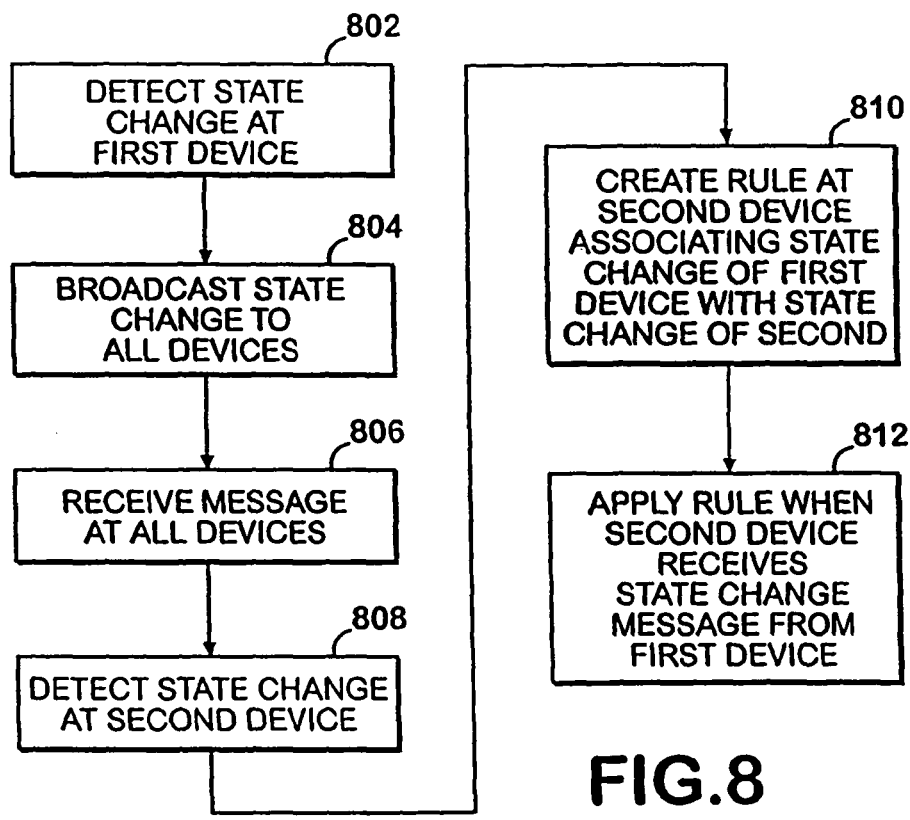
FIG. 8 is an exemplary operational flow of rule acquisition of an interactive device involving learning by a device receiving a state change after a state change of another device.

FIG. 8 shows the logical operations where the device whose state changes later in time learns the interaction rule. The operations begin at detect operation 802 where a first device detects a change of state through its state sensor. The first device determines that a broadcast is appropriate and sends the broadcast of the state change to all devices of the environment at broadcast operation 804. All devices receive the broadcast at receive operation 806.

After receiving the broadcast, each device of the environment monitors for its own state change. A second device that received the broadcast detects its state change at detect operation 808 within a predetermined period of time from when the broadcast was received. The second device then creates the interaction rule by associating the state change of the first device with the state change of the second device at rule operation 810. The rule is stored in the memory of the second device so that the processor can apply the rule thereafter.

At application operation 812, the second device receives the state change message from the first device and then applies the interaction rule that has been learned to automatically change its state accordingly. The second device applies the interaction rule by looking up the state change of the first device in its memory to see if there is an association with any state changes of the second device. The previously learned rule specifies the state change of the second device, and the second device automatically changes state without requiring the user to manually request the change.

As an example of this method of learning, the user may turn on the VCR which sends a broadcast of the state change. The user shortly thereafter tunes the TV to channel 3 to watch the VCR signal. The TV has received the broadcast from the VCR prior to the user tuning to channel 3, and therefore, the TV associates the tuning to channel 3 with the VCR being powered on to learn the interaction rule. Thereafter, when the user turns on the VCR, the TV automatically tunes to channel 3.

Figure 9:
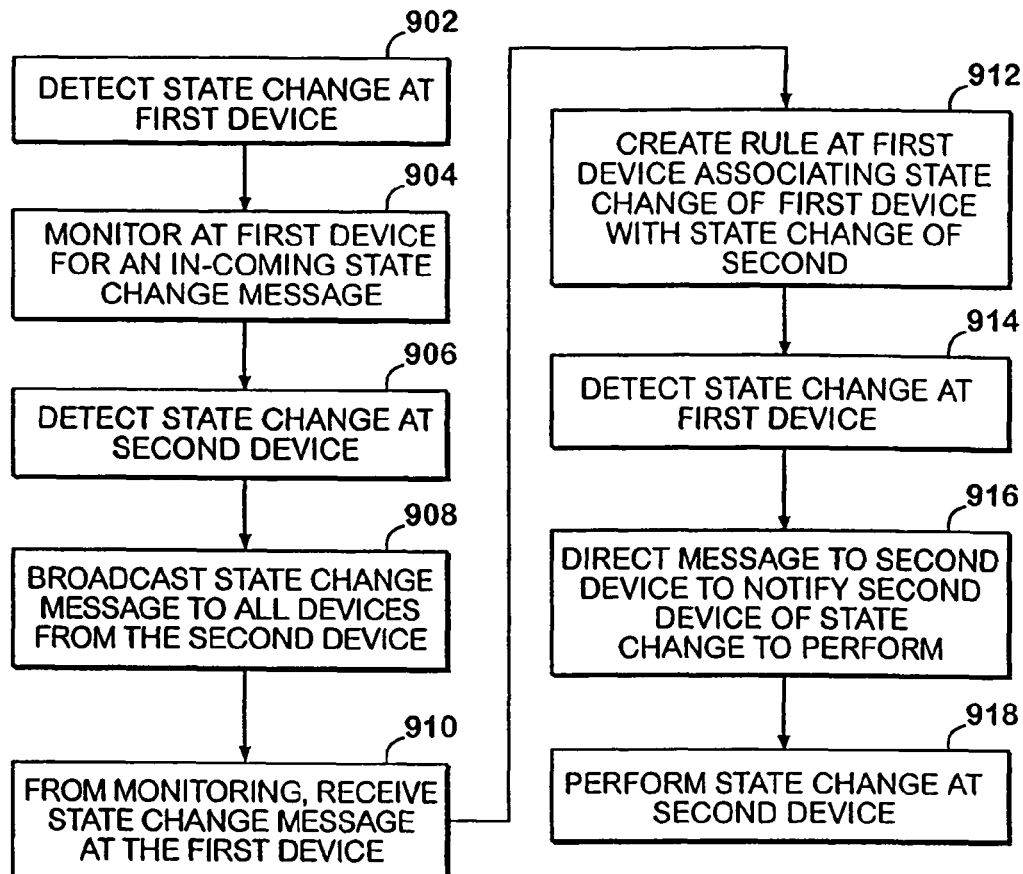
FIG. 9 is an exemplary operational flow of rule acquisition of an interactive device involving learning by a device receiving a state change before a state change of another device.

FIG. 9 shows an alternative method of learning where the first device to have a change of state learns the interaction rule. The logical operations begin at detect operation 902 where a first device detects its own change of state. In response to the change of state, the first device then begins monitoring for incoming state change messages at monitor operation 904. Subsequently, a second device receives a change of state at detect operation 906 and broadcasts the change of state message to all devices at broadcast operation 908. The broadcast is effectively a request that any device previously experiencing a state change add the second device to its subscriber list.

While monitoring, the first device receives the change of state message from the second device at receive operation 910. Because this message was received within a predetermined amount of time from when the first device detected its own change of state, the first device creates an interaction rule at rule operation 912. The first device creates the interaction rule by adding the second device and state change to its subscriber list that is associated with its state change. Subsequently, the first device detects its state change at detect operation 914 and then directs a message to the second device at message operation 916 in accordance with the interaction rule learned by the first device.

The message to the second device provides notification that the second device should perform a particular state change. Once the message is received at the second device, the message is interpreted, and the second device automatically performs the appropriate state change with no input from the user at state operation 918. As an example of this method of learning, the user turns on the VCR which begins to monitor for a state change broadcast. The user tunes the television to channel 3 shortly thereafter, and the television broadcasts the state change. The VCR receives the broadcast and associates the TV to channel 3 state change with its power on state change. After the rule is created and when the user powers on the VCR, the VCR executes the rule by sending a message with instruction to the TV. The TV implements the instruction to automatically tune to channel 3.

Figure 10:
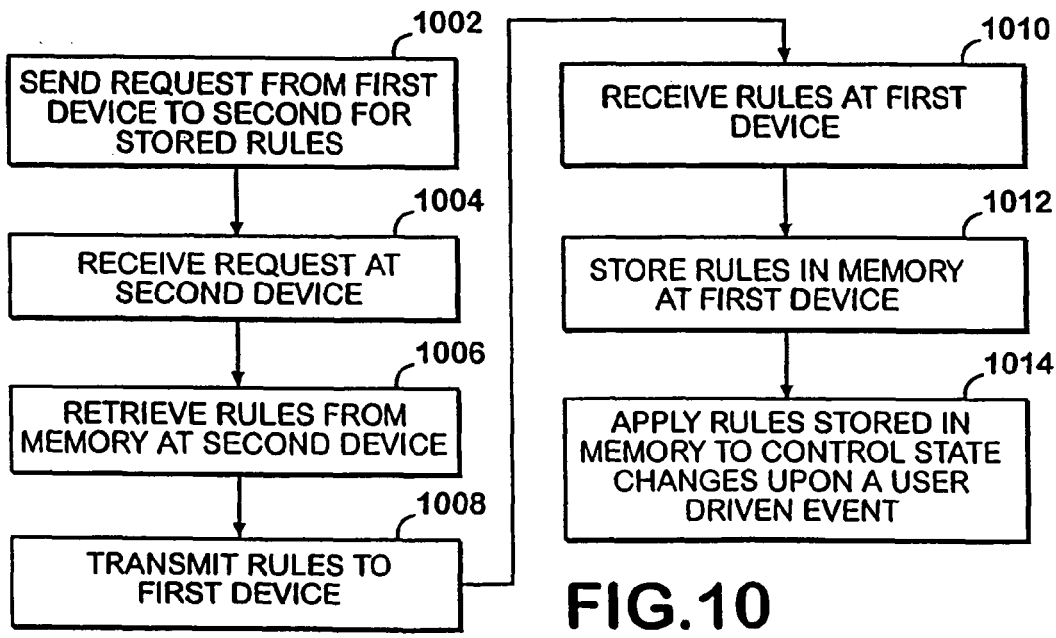
FIG. 10 is an exemplary operational flow of rule acquisition of an interactive device involving a request for rules to a device and a subsequent response.

FIG. 10 shows another alternative learning method. For this method, it is assumed that a device already has one or more interaction rules. The logical operations begin at send operation 1002 where a first device sends a request to a second device. The request is for the interaction rules stored by the second device. The rules of the second device may be relevant to the first device for various reasons such as because the first device is involved in the interaction rules of the second device or because the first device is acting as an aggregator that controls interaction of the environment. The details of the aggregator are discussed in more detail below.

After the first device has sent the request, the second device receives the request at receive operation 1004. The second device then retrieves its interaction rules from memory at rule operation 1006. The second device then sends a reply message to the first device at send operation 1008 that includes the interaction rules of the second device. The first device receives the reply message with the rules at receive operation 1010 and stores the rules in memory at rule operation 1012. Thereafter, the first device can apply the rules stored in memory to control state changes upon user driven events at application operation 1014.

Figure 11:
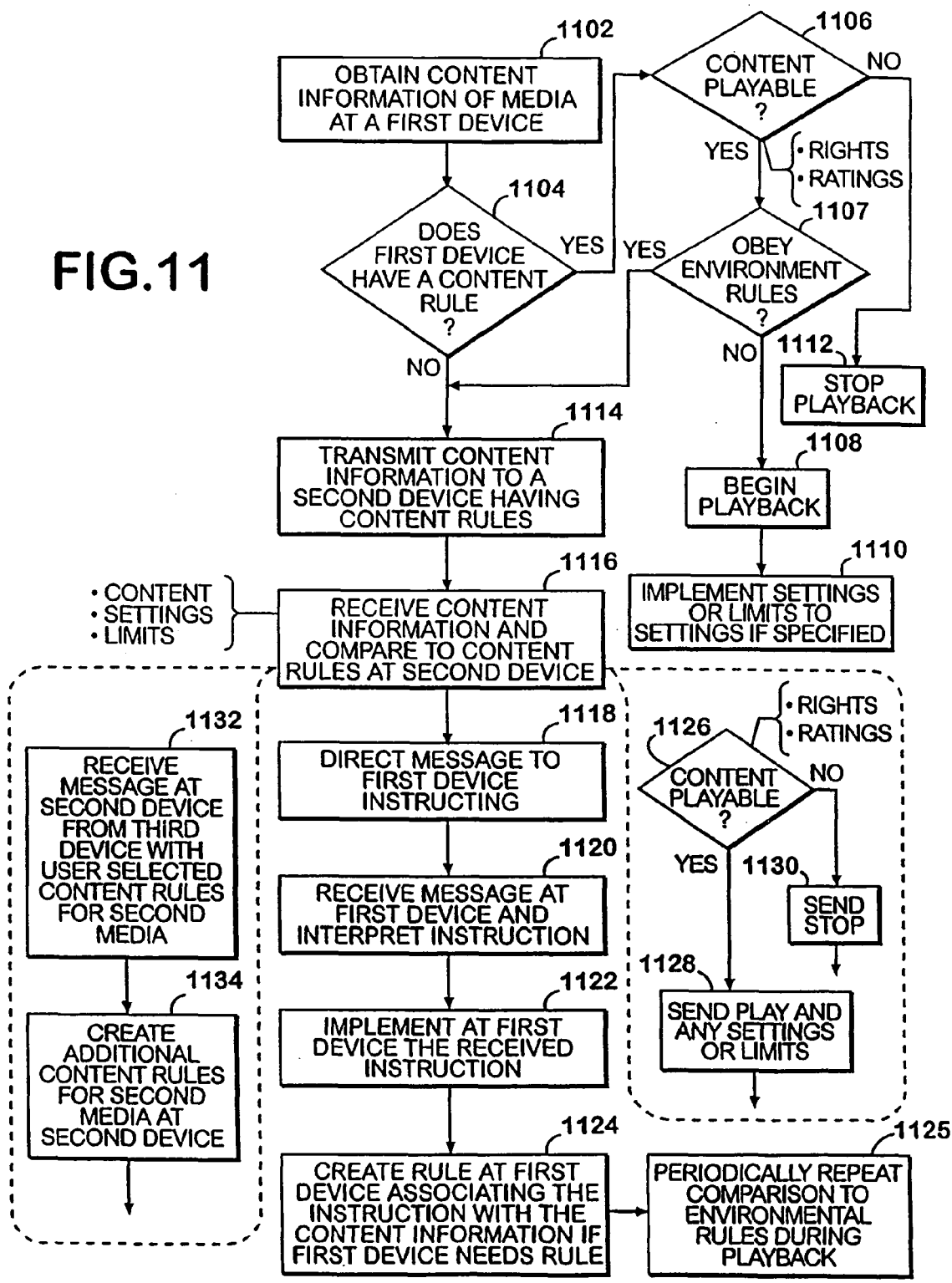
FIG. 11 is an exemplary operational flow of content control among interactive devices.

Device interaction also permits additional functionality among the devices of an environment such as the control of media content to be played within the environment and the control of device settings dependent upon the particular media being played. FIG. 11 shows the logical operations of device interaction involving a device, such as an aggregator, that is in charge of the content control and/or content settings for a device environment. For example, a user may set up a parental control at one device, and the one device then becomes the instigator of content control for other media playback devices of the environment. Also, where digital rights are required for playback, the instigator of content control may manage those digital rights to prevent unauthorized playback.

The logical operations begin at content operation 1102 where a first device is attempting to play media. Here, the first device obtains content information included within the media, such as recognizing the title of a CD or DVD that is about to be played. Obtaining the content information applies for devices that support multiple media formats, such as a DVD player obtaining content information from DVDs or audio CDs during playback. Then, at query operation 1104, the first device detects whether it has its own content rules. If so, then the first device detects whether the content is playable by comparing the content information to the associated content rules. At least two checks may be done at this point, one for content ratings and one for content rights. Content ratings are limits on the ratings of media that can be played, such as no content worse than a PG rated movie or no content with a particular type such as excessive adult language. Content rights are digital rights for playback authorization that prevent copyright or license infringement.

If the content is not playable, then the first device stops playback at stop operation 1112. If the content is playable, then two options may occur depending upon whether the first device is configured to obey content rules from a device environment in addition to its own content rules. For example, the first device for media playback may be portable and may easily be taken to other device environments that impose more stringent restrictions on media content than the first device imposes on itself. At query operation 1107, the first devices detects whether it is configured to obey content rules of the environment in addition to its own content rules. If the first device is configured to obey only its own content rules, then the first device begins normal playback of the media at playback operation 1108. The first device may reference content rules at this point at settings operation 1110 to determine whether the content being played back has an associated preferred setting or setting limitation. For example, a user may have configured a rule that a particular movie is to be played back at a preferred volume setting or that the volume for playback cannot exceed a particular setting. The first device implements the preferred setting or limitation during playback.

If the first device is configured to obey its own content rules as well as the content rules of any environment where it is placed, then after determining that the media content is playable according to its own rules, operational flow transitions from query operation 1107 to send operation 1114. Additionally, if query operation 1104 detects that the first device does not have an applicable content rule, then operational flow transitions directly to send operation 1114.

At send operation 1114, the first device transmits a message having the content information previously obtained to a second device that maintains content rules for the current environment where the first device is located. The second device receives the message with the content information and compares the content information to the stored content rules at rule operation 1116. The comparison to the content rules again involves content ratings and/or rights, settings, and/or setting limitations. The details of this comparison are also shown in FIG. 11.

The comparison begins at query operation 1126 where the second device detects whether the content is playable in relation to the content rules. The content rules may specify a maximum rating and/or whether digital rights exist for the content being played. Other limitations may also be specified in the content rules for comparison to the content information, such as a limitation on adult language present in the content that is indicated by the content information. If the content is not playable, then the comparison indicates that a stop instruction should be sent at stop operation 1130. If the content is playable, then the comparison indicates that a play instruction should be sent along with any associated settings or setting limitations at playback operation 1128.

Once the comparison is complete, the second device directs a message to the first device at send operation 1118, and the message instructs the first device according to the stop instruction or playback instruction resulting from the previous comparison to the content rules. The first device receives the message and interprets the instruction at receive operation 1120. The first device then implements the received instruction to either stop playing the media content or begin playback with any specified settings or limitations at implementation operation 1122.

As an option, the first device may then create a content rule that associates the instruction with the content information at rule operation 1124 if the first device does not already have a local content rule. By creating the rule at the first device, the first device will at query operation 1104 detect that a content rule exists on subsequent attempts to play the same content. The first device will then handle its own content control without requiring communication with the second device.

The second device may obtain content rules through various methods. For example, the second device may receive a message from a third device at receive operation 1132, and the message specifies a content rule. A user may have selected a content rule at the third device for media playback, and the third device then provides the rule to the second device as an automatic function or in response to a request for content rules from the second device. The second device creates the content rule by storing it in memory at rule operation 1134.

During playback, the first device periodically repeats the comparison to environmental content rules at rule operation 1125, as was initially done at rule operation 1116. This operation 1126 is done periodically because if the first device is portable it may change locations after the start of playback. In that case, if the playback was initially permissible but later becomes impermissible because the first device enters a more restrictive device environment, then playback stops as indicated at stop operation 1130.

Figure 12:
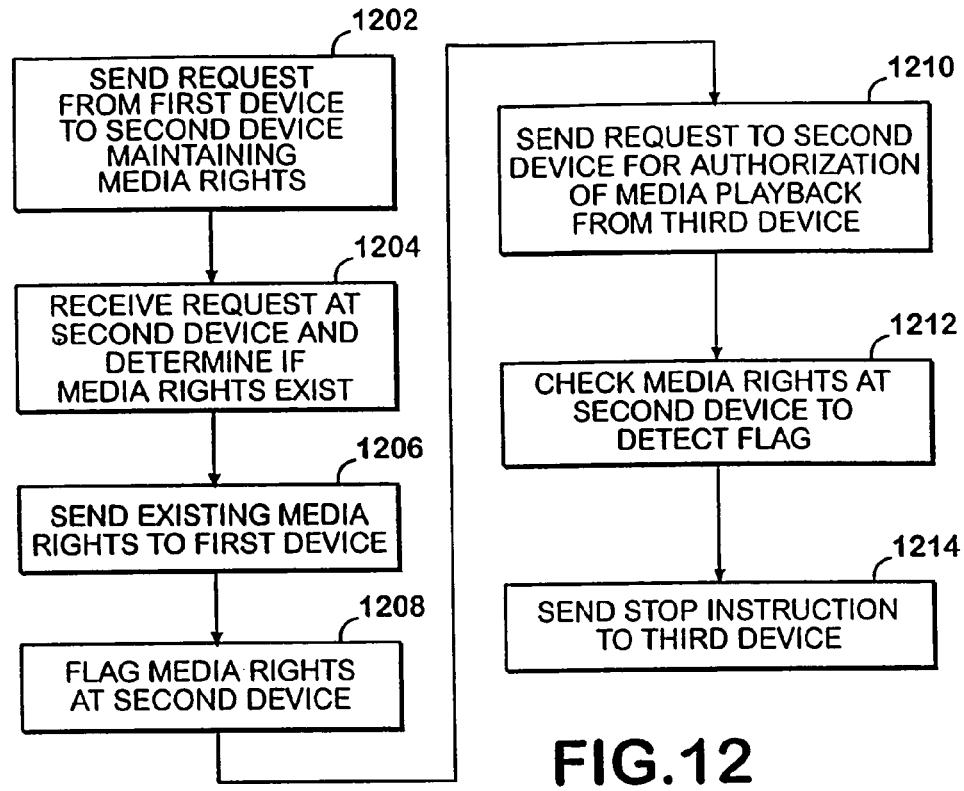
FIG. 12 is an exemplary operational flow of media rights sharing among interactive devices.

FIG. 12 shows logical operations demonstrating the borrowing of media rights of a content rule from a device, such as an aggregator, that maintains the content rules. The logical operations begin by a first device sending a request to borrow media rights to a second device that maintains the media rights at send operation 1202. For example, the first device may be an MP3 player and the request is for permission to play a particular song or volume of songs.

The second device receives the request and determines if the media rights to the content exist at receive operation 1204. If so, and they are not flagged as borrowed, then the second device sends the media rights to the first device to allow the first device to play the content at send operation 1206. The media rights are then flagged as borrowed at the second device at flag operation 1208. Subsequently, when a third device requests authorization for media playback from the second device for the same content at send operation 1210, the second device then checks the media rights at test operation 1212 and detects the flag. The second device then sends a stop instruction to the third device at send operation 1214 to prevent the third device from playing the content because the first device already has rights to it.

These logical operations could also be adapted to provide a count for the media rights so that more than one device can access the media rights for playback of content if multiple rights are owned for the content. Each time the media rights are borrowed by a device, the count of media rights is decremented. Once the count reaches zero, stop instructions are sent to the devices subsequently attempting playback. Furthermore, there can be a similar device exchange to unflag the digital rights or increment the count to restore capability of other devices to subsequently borrow the digital rights to media content.

Figure 13:
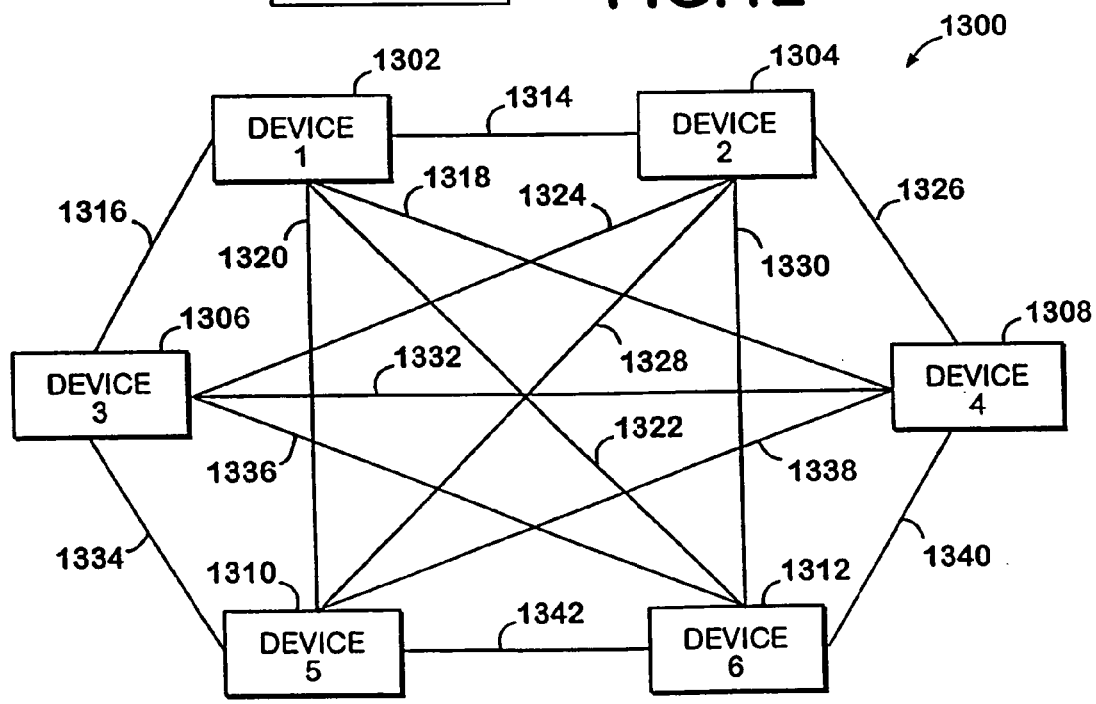
FIG. 13 is a diagram of a device environment that illustrates the complexity that occurs in relation to interactivity among an increasing number of devices.

The device interactions discussed above including general interaction to bring about states changes, interactive learning of interaction rules, and interactive content control become increasingly complicated as the number of devices in the environment increase. As shown in FIG. 13, when the number of devices of an environment 1300 grows to six, the number of bi-directional communication paths grows to fifteen to ensure that every device can communicate directly with every other device. Each device uses five bi-directional paths (a first device 1302 uses paths 1314, 1316, 1318, 1320, and 1322; a second device 1304 uses paths 1314, 1324, 1326, 1328, and 1330; a third device 1306 uses paths 1316, 1324, 1332, 1334, and 1336; a fourth device 1308 uses paths 1318, 1326, 1332, 1338, and 1340; a fifth device 1310 uses paths 1320, 1328, 1334, 1338, and 1342; and a sixth device 1312 uses paths 1322, 1330, 1336, 1340, and 1342).

The complexity in coordinating the communications and interactions in such a crowded environment 1300 may result in inadequate bandwidth for the communication channels, cross-talk between the channels, and incompatible transports between devices. Furthermore, unintended rules may be learned because one or more of the devices may be unrelated to the others. For example, one person may answer the telephone shortly before another person starts the clothing dryer. There was no intended relationship but the phone or the dryer may associate the two state changes as an interaction rule, which the users never intended.

Figure 14:
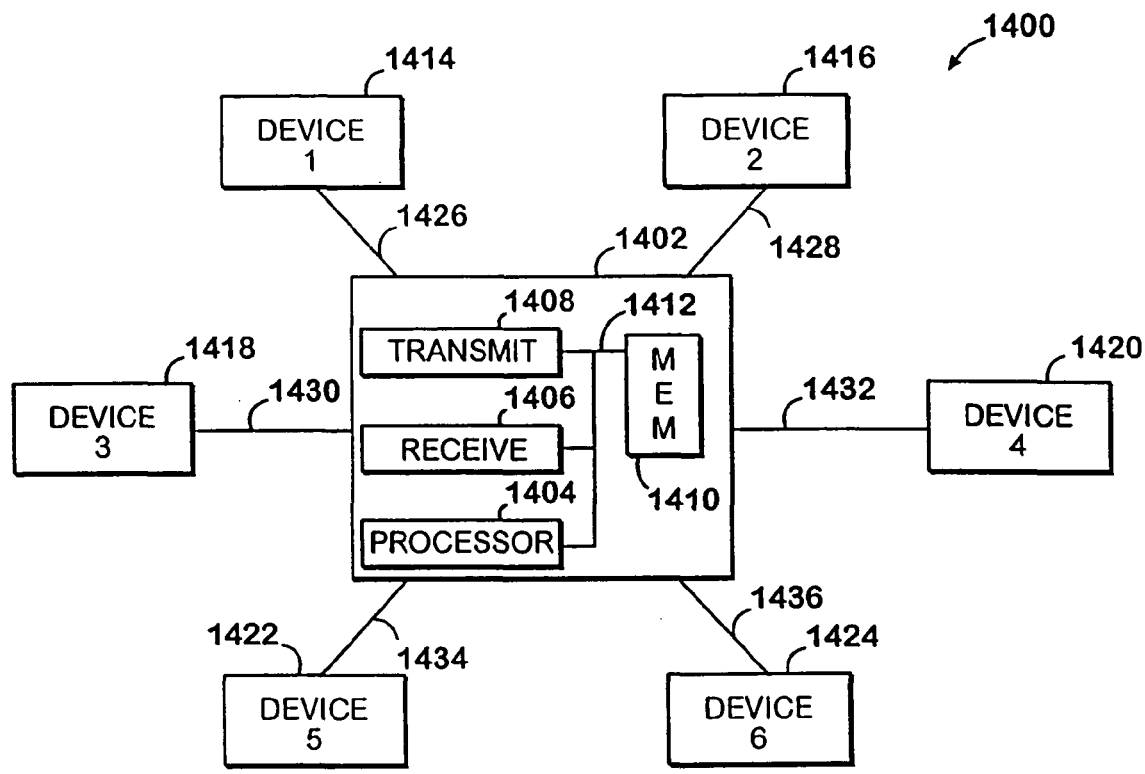
FIG. 14 is a diagram of a device environment including an embodiment of an aggregator that also illustrates the major components of the aggregator.

An aggregator 1402 as shown in FIG. 14 may be introduced into a crowded environment 1400 to alleviate one or more of the concerns. As shown in FIG. 14, an aggregator 1402 can be used to reduce the number of bi-directional communications paths. For the six device environment, the aggregator has reduced the number of paths down to six (device 1414 uses path 1426, device 1416 uses path 1428, device 1418 uses path 1430, device 1420 uses path 1432, device 1422 uses path 1434, and device 1424 uses path 1436). The aggregator 1402 acts as a conduit of communication from one device to another, and may also be configured to control or otherwise manage functions of a single device.

The aggregator 1402 uses a transmitter 1408 and receiver 1406 capable of communicating with the multiple devices. The transmitter 1408 and receiver 1406 may be configured to receive from all devices using various techniques known in the art. For example, frequency division multiplexing, time division multiplexing, code division multiplexing, optical multiplexing, and other multiplexing techniques may be used for a particular environment 1400 so that multiple devices can communicate with the aggregator 1402.

The aggregator 1402 also has a processor 1404 and a memory 1410. The processor 1404 communicates with the transmitter 1408, receiver 1406, and memory 1410 through a bus 1412. The aggregator 1402 may be incorporated into a particular device of the environment as well so that the aggregator includes the additional device features such as components and a state sensor discussed in relation to FIG. 2. The logical operations of an aggregator such as shown in FIG. 14 are discussed below.

The processor 1404 of the aggregator may be configured to perform various advanced functions for the device environment. The processor 1404 may be configured to perform periodic review of interaction rules to edit rules that are inappropriate for various reasons. For example, memory 1410 may contain a list of impermissible associations that the processor 1404 may refer to when reviewing interaction rules. If an impermissible association is found the, communication link that causes the problem may be excised from the rule. Additionally, the processor 1404 may be configured to entirely remove interaction rules that are inappropriate.

The processor 1404 may also be configured to support complex interaction rules. For example, devices may be separated into classes so that actions of one device may only affect devices within the same class. The processor 1404 may reference such class rules in memory 1410 to filter out faulty rules that might otherwise be learned, such as those where devices of different classes are involved. Furthermore, the processor 1404 may be configured to develop rules based on conditional logic or iterative logic, and perform multiple activities of a rule in series or in parallel.

As an example of conditional logic being employed, a rule may specify that a phone ringing means the volume should be decreased for several different devices but only if they are actively playing content. Then when the phone hangs up, the volume should be increased but only for those devices whose volume was decreased by the phone ringing. An example of iterative logic provides that the front porch lights should be turned on at 6 p.m. and off at 12 a.m. everyday.

An example of serial execution of interaction rules with multiple activities provides that when a light on a computer desk is turned on, the computer is then turned on, and after that the monitor is turned on followed by the computer speakers being turned on. An example of parallel execution of interaction rules with multiple activities provides that when a person is exiting a room, all devices of the room are powered off simultaneously.

Figure 15:
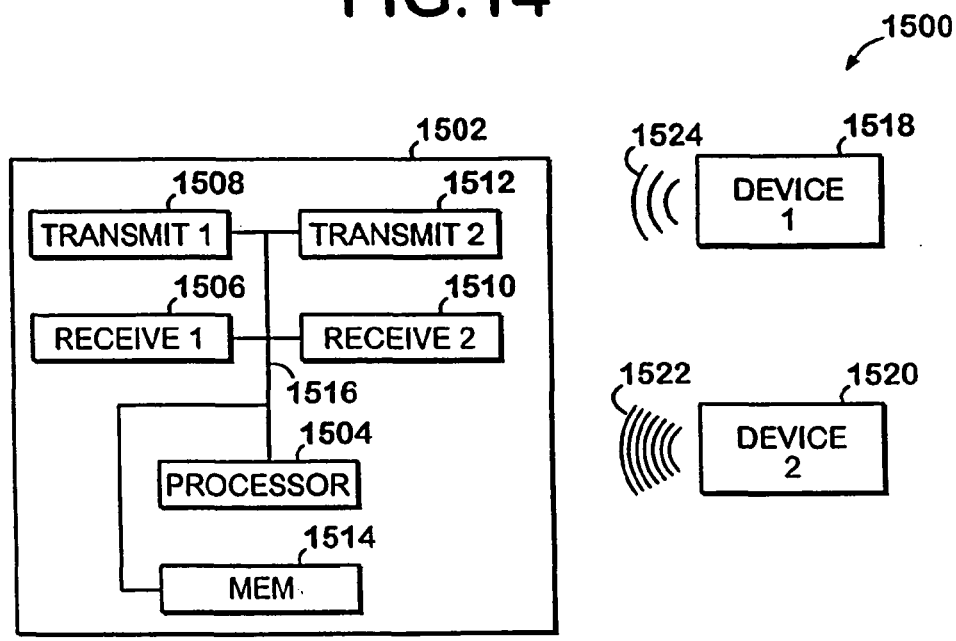
FIG. 15 is a diagram of an embodiment of an aggregator illustrating the components for translating among multiple communication transports.

FIG. 15 illustrates an embodiment of an aggregator 1502 that is additionally configured to translate among different communication transports of the device environment 1500. Device 1518 may communicate through signals 1524 of a first communication transport while device 1520 communicates through signals 1522 of a second communication transport. For example, the first communication transport may be Ethernet while the second communication transport is fiber optical. The communication transports may differ in the physical mode of transferring signals (e.g., Ethernet versus fiber optical) and/or in the logical mode (a first data encoding scheme versus a second).

The aggregator 1502 includes a first transmitter 1508 and receiver 1506, separate or combined as a transceiver, for communicating across the first communication transport. The aggregator may also include a second transmitter 1512 and receiver 1510, separate or combined as a transceiver, for communicating across the second communication transport where the second communication transport differs in the physical mode of transport. A processor 1504 communicates with memory 1514 and the two transmitter-receiver pairs through a bus 1516. Although two transmitter-receiver pairs are shown for two communication transports, one skilled in the art will recognize that any number of transmitter-receiver pairs and communication transports may be utilized, including only one, depending upon the different number of physical transports to support within the device environment.

The processor 1504 detects from the messages being received where communications should be directed. This includes determining whether the messages should be translated to a new communication transport when sending the message to the intended device. The processor 1504 may perform the same logical operations of the processor of aggregator 1402 with the addition of translation operations from one transport to another where necessary.

Figure 16:
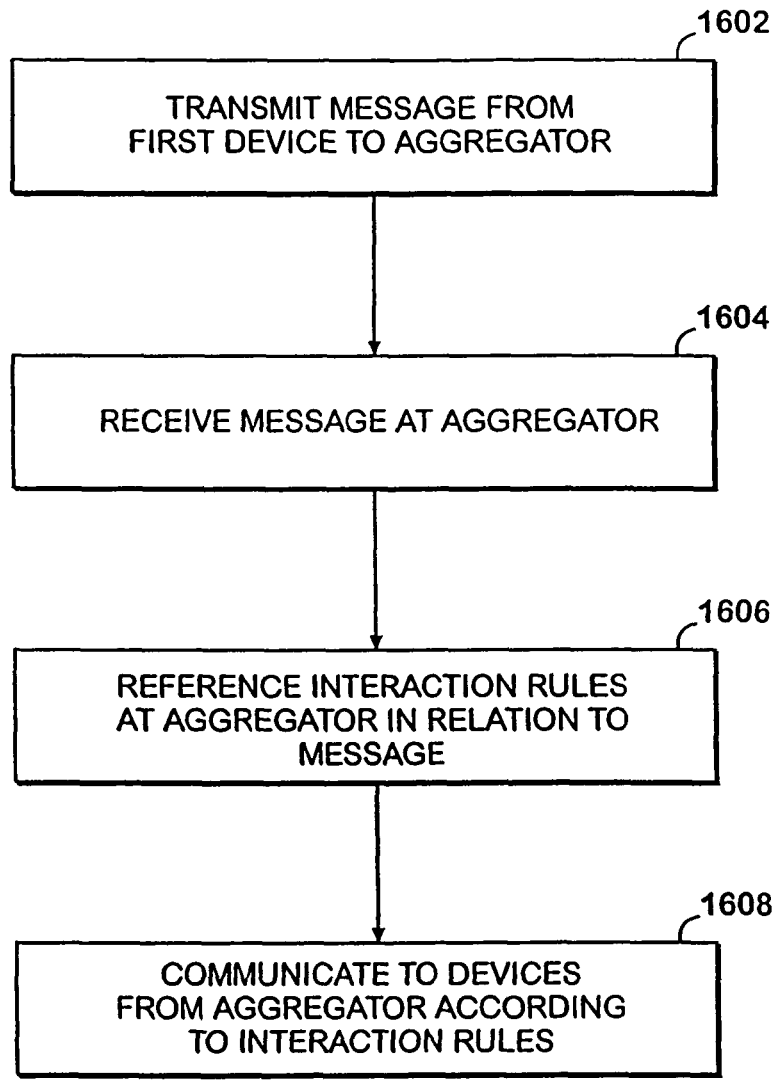
FIG. 16 is an exemplary operational flow of device interaction involving an aggregator.

FIG. 16 shows the basic logical operations of an aggregator. The logical operations begin when a first device transmits a message to the aggregator at send operation 1602. The first device may send a message to the aggregator that is intended as a broadcast to all devices, as a message directed to a specific device, or as a message intended solely for the aggregator. The aggregator receives the message at receive operation 1604.

The aggregator then references interaction rules that it maintains in memory in relation to the message it has received at rule operation 1606. For example, the environment may be configured so that the devices maintain no interaction rules other than to direct a message for every state change to the aggregator and rely solely on the interaction rules of the aggregator to bring about subsequent activity in the environment.

The environment may alternatively be configured where the devices maintain interaction rules and provide instruction to the aggregator with each message, so that the aggregator acts upon the instruction to bring about subsequent activity.

After the aggregator has received the message and referred to the interaction rules in relation to the message, the aggregator communicates with devices of the environment in accordance with the interaction rules and any received instruction from the first device at communication operation 1608. For example, the aggregator may possess the interaction rule that when the VCR is on, the TV should be tuned to channel 3. When the aggregator receives a power on message from the VCR, the aggregator then sends an instruction to the TV to tune to channel 3. Alternatively, the power on message may instruct the aggregator to send an instruction to the TV to tune in channel 3.

Figure 17:
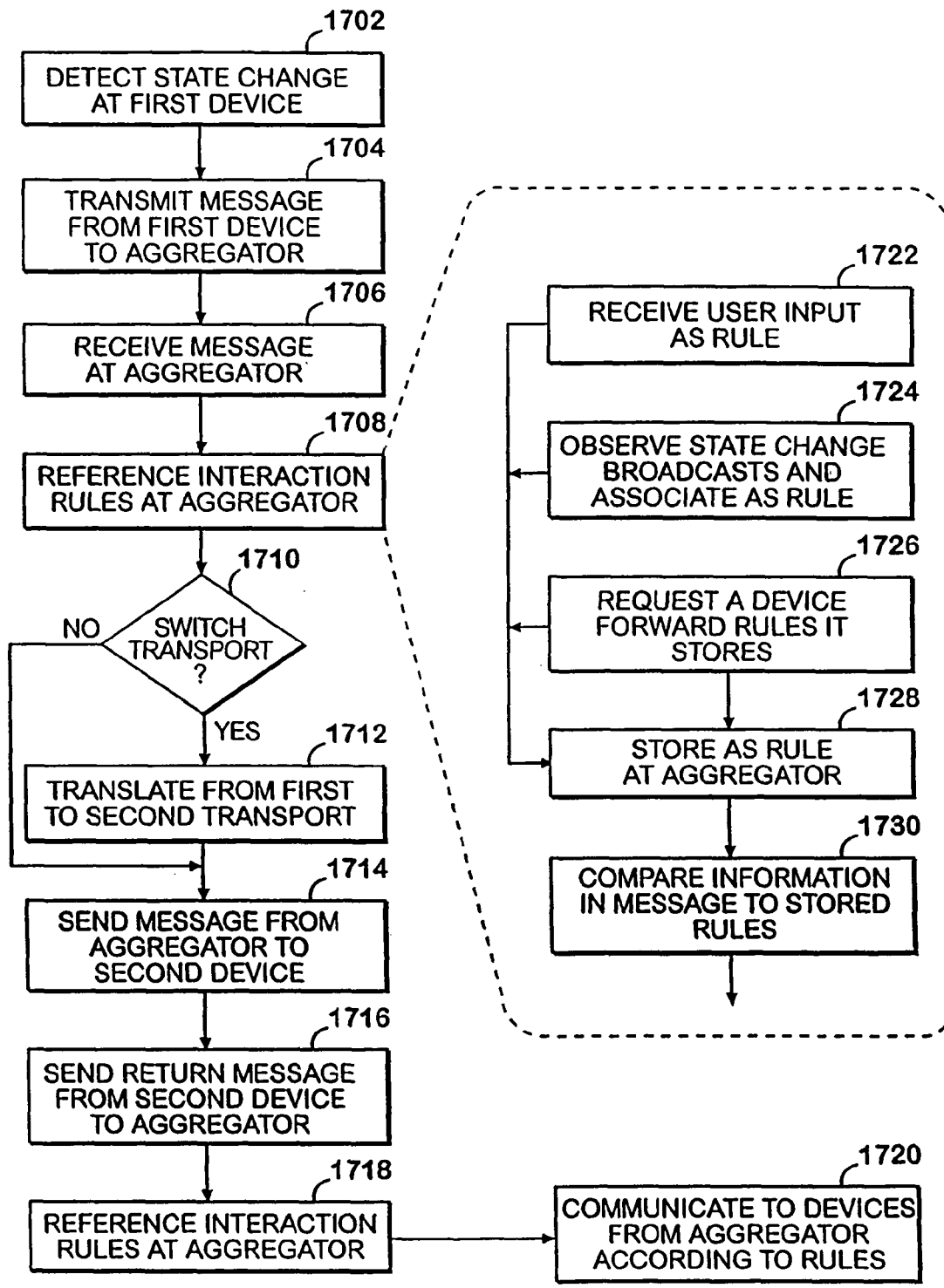
FIG. 17 is an exemplary operational flow of device interaction involving an aggregator that learns interaction rules and translates among multiple communication transports.

FIG. 17 shows the logical operations of an embodiment of an aggregator, such as the aggregator 1502 of FIG. 15. The logical operations begin at detect operation 1702 where the first device detects its own state change. The first device then sends a message to the aggregator at send operation 1704. The aggregator receives the message at receiver operation 1706 and references its interaction rules at rule operation 1708 in relation to the received message indicating the state change.

The aggregator tests whether to switch communication transports at query operation 1710 by referencing its interaction rules. The interaction rules specify how to communicate with each device. The aggregator learns the one or more devices to communicate with in response to the message from the first device by either looking up the state change of the first device in the interaction rules to find associations or by interpreting an instruction from the first device included in the message. After determining the proper device to communicate with, the aggregator can look up the device in memory to determine which communication transport to employ.

Once the aggregator has determined which transport to use for the next communication, the message from the first device or a new message from the aggregator is prepared by translating to the second communication transport appropriate for the next communication at translate operation 1712. Where only the logical mode of communication transport differs, a second communication transport may not be needed. Furthermore, the aggregator may act as a conduit where no change in the physical or logical mode of transport should occur. As an example of where a change in transport does occur, the aggregator may receive a message from the VCR via infrared airwave signals and then prepare a message to the TV to be sent via a fiber optical connection. The aggregator sends the message to the second device at send operation 1714. The second message may instruct the second device that the first device has changed state if the second device has its own interaction rules, or the message may provide a specific instruction to the second device.

After receiving the message, the second device implements any instruction or automatic state change dictated by its own interaction rules. The second device may respond to the aggregator if necessary at send operation 1716. The return message may be an indication to the aggregator of the state change that the second device has performed or may be a reply to a request from the aggregator such as for current state, capabilities, or rules. The aggregator again references its interaction rules at rule operation 1718 to determine the next action after receiving the message from the second device. The aggregator then communicates with other devices of the environment as necessary at communicate operation 1720.

The logical operations for the aggregator learning the interaction rules being applied are also shown in FIG. 17. Several possibilities exist for learning rules at the aggregator. A user interface discussed below may be provided so that a user enters interaction rules at user operation 1722. The aggregator may observe closely occurring state change broadcasts that are associated as interaction rules at observation operation 1724, as was discussed above for learning with individual devices. The aggregator may request that a particular device forward its interaction rules to the aggregator where they can be stored and implemented at request operation 1726.

After receiving the interaction rule in one of the various ways, the aggregator stores the interaction rule at rule operation 1728. When state change messages are received at the aggregator and the aggregator references the interaction rules such as at rule operation 1708, the aggregator compares information in the message to the stored rules at comparison operation 1730. Through the comparison, the aggregator determines the appropriate action to take to complete communication to other devices.

Device interaction within the device environment allows the burden on the user to be lessened while the user is present within or absent from the environment. However, under certain scenarios the user is absent but needs to remain in contact with the device environment. For example, the user may need to know when the oven is finished cooking so the user can return home, or the user may need to delay the oven from automatically preheating at a certain time because the user will be late. Therefore, for these scenarios the device environment needs to communicate remotely with the user.

Figure 18:
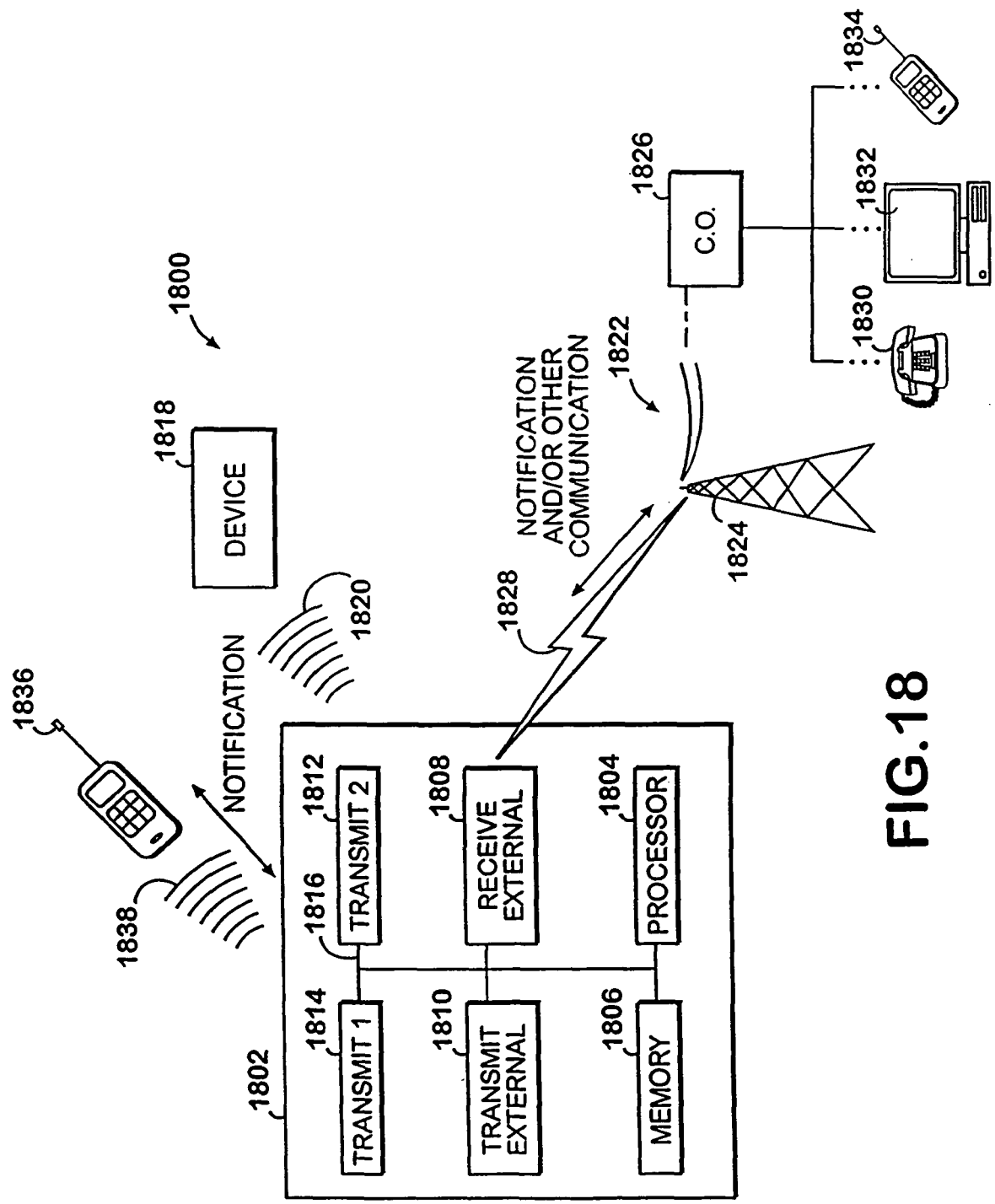
FIG. 18 is a diagram of a device environment interacting with notification devices interfaced with a user.

FIG. 18 shows one illustrative case of device communication where the messages extend beyond a closely defined area, such as a single room or household, to an external or broader area. The external area includes any destination reachable via a communications network. Thus, in this illustrative case, the device environment is not defined by proximity but by explicit definition by the user. Such explicit definition may be provided by the user in many ways, such as through a listing stored in memory that describes the devices and their address where they may be accessed through communication networks including the Internet, wireless communication network, and landline telephone network. Thus, as used herein, device environment should be understood to include both environments defined by proximity as well as explicitly defined environments.

Additionally, FIG. 18 shows an illustrative case of device communication where notification messages are passed between a notification device that is interfaced with the user and devices of the environment not otherwise interfaced with the same user. Thus, messages may be passed to the user from devices of the environment and from the user to the devices without the user interacting directly with those devices that send or receive the message. Such notification devices may be external, as discussed above, in that they are not part of the device environment through proximity but by explicit definition by the user, or the notification devices may be in close proximity and be included in the device environment on that basis.

A device 1802 such as an aggregator for sending notifications to the notification device of the user and/or for communicating to both devices defined by proximity and external devices is present in the environment 1800. The device 1802 includes at least one transmitter 1814 and receiver 1812 for communicating with proximity based devices 1818 in the environment 1800 over a communication transport 1820. The device 1802 of includes a memory 1806 that stores interaction rules and a processor 1804 for executing the functions of the device 1802. The processor 1804 communicates through the bus 1816. The memory 1806 may also store translation rules in the embodiment where communication with notification devices is supported.

The device 1802 of this embodiment also includes at least one transmitter 1810 and receiver 1808 that communicate through a remote communications transport 1828 to external devices. The remote communications transport 1828 may take various forms such as a conventional telephone network 1822 including a central office 1826. The remote communications medium may additionally or alternatively involve a wireless network 1824 for mobile telephones or for pagers.

Communication can be established between the device 1802 and a remotely located telephone 1830, computer 1832, or wireless communication device 1834 such as a mobile phone or pager which is explicitly defined in memory 1806 as being part of the device environment. The device 1802 can relay information between itself or other proximity based devices of the environment 1800 and the remotely located communication devices.

In the embodiment where notification devices are supported, the user can remain in contact with the device environment 1800 by communicating through the notification devices that are either external, such as devices 1830-1834, or are proximity based, such as device 1836. For example, the device 1802 may send short messages to a mobile phone 1834 or to a proximity based portable communication device 1836 if the user is in proximity. The device 1802 may provide machine speech or text that can be interpreted by the user as a notification of a state of the environment. Similarly, the user may send machine tones, speech, or text back to the device 1802 that can be interpreted by the device 1802 as an instruction for the environment.

For example, to implement the notification process the processor 1804 may recognize a set of voice commands, tones, or text and translate those into instructions for various devices by referencing translation rules to interpret the instruction. The processor 1804 may then reference interaction rules to communicate the instruction to the appropriate device based on identification received in the message from the remote device. Likewise, the processor 1804 may choose from a set of machine voice commands, tones, or text to communicate messages from the environment back to the user when the interaction rules indicate that the remote device should be contacted.

Figure 19:
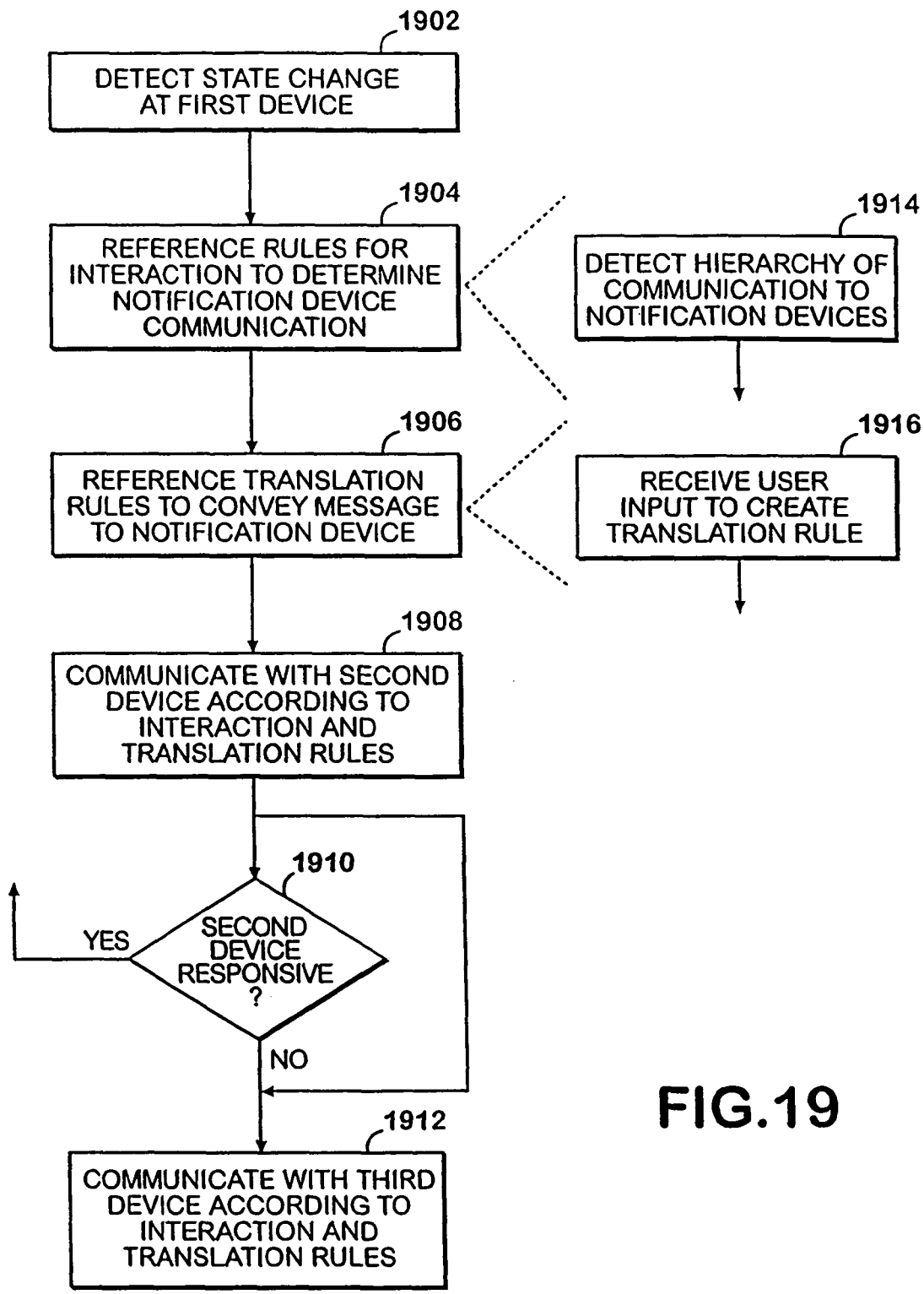
FIG. 19 is an exemplary operational flow of interaction from a device environment to a remote notification device through a remote communication transport.

FIG. 19 shows the logical operations for communication from the device environment to the notification device 1830-1834 or 1836. The logical operations begin at detect operation 1902 where a first device of the environment detects its own state change. The first device itself or a dedicated device for remote communications such as an aggregator may then reference rules for interaction to determine whether a notification communication is necessary based on the state change at rule operation 1904. For example, if the previously discussed content control device detects that unacceptable content playback is being attempted, a notification may be provided to the notification device 1836 or 1830-1834.

The interaction rules may provide a hierarchy of communication with notification devices, or for other non-notification devices as well, so that a particular state change may require that communications cycle through a list of devices until a response is received or the list is exhausted. At detect operation 1914, the appropriate device of the environment determines from the interaction rules the order of communication that should occur. For example, a particular state change may require that a page be left with the user followed by a call to a mobile phone if there is no response to the page within a certain amount of time.

The logical operations of FIG. 19 assume that the notification device is an external device that is explicitly defined by the user. Thus, after determining the one or more notification devices to contact, the device of the environment references translation rules at rule operation 1906 to determine how to convey the message to the remotely located notification device that should be contacted. The translation rules are typically specified by the user directly at input operation 1916. Through a user interface, the user can specify the hierarchy and the particular translation rules to use. For example, the user can specify that a pager is contacted by dialing a specific telephone number over the ordinary telephone network, and that a text message should be left upon an answer. Rules may also include constraints such as the range of time when a particular notification device should be contacted.

The device of the environment executes the interaction rule and translation rule to communicate remotely to a second device (i.e., a notification device) at communication operation 1908. As one exemplary option where a hierarchy is employed, the device tests whether the second device has responded at query operation 1910. If so, then the logical operations return to await the next state change requiring remote communications. If not, then the device of the environment communicates remotely to a third device (i.e., a different notification device) as specified in the hierarchy at communication operation 1912 again with reference to the interaction and translation rules. Cycling through the devices of the hierarchy continues until query operation 1910 detects a response or the list is exhausted.

Another exemplary option is to communicate with one or more notification devices without regard to a hierarchy. After the device of the environment has provided a communication to the second notification device, then a communication is automatically provided to the third notification device at communication operation 1912. This continues for as many remote devices as specified in the interaction rules.

Figure 20:
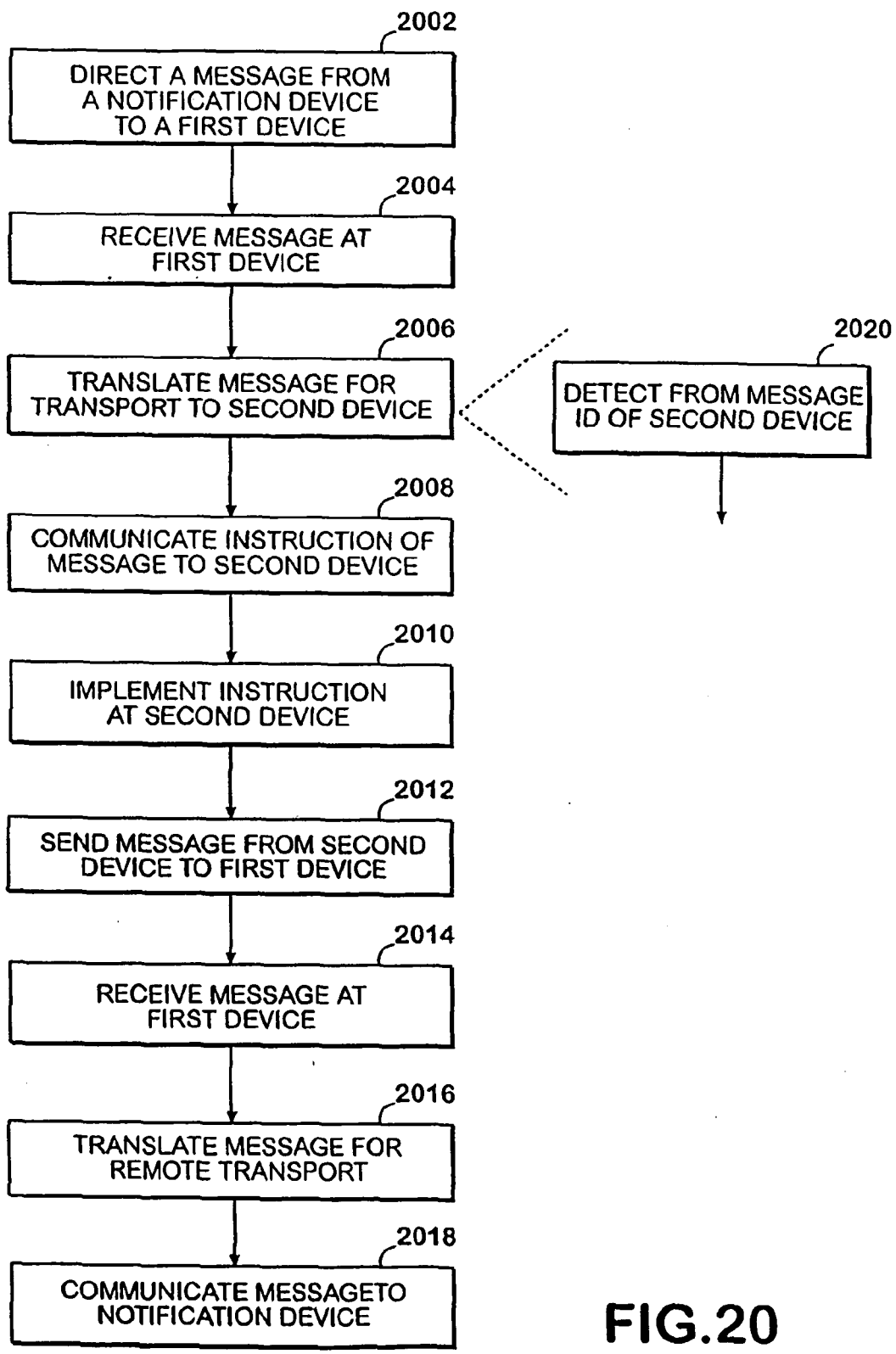
FIG. 20 is an exemplary operational flow of interaction from a remote notification device to a device environment through a remote communication transport.

FIG. 20 shows the logical operations for communications from the notification device back to the device environment. At send operation 2002, the notification device directs a message to a first device of the environment that completes notification communications. For example, where the notification device is external to the proximity defined device environment, the first device may maintain a connection to a telephone line, and the user dials the number for the line to contact the first device. The first device answers the call and awaits data signals from the remote notification device. The remote notification device then provides the message by the user speaking or using dialing tones.

The first device receives the message at receive operation 2004 and translates the message for transport to a second device of the environment at translate operation 2006. The first device may translate the message by referencing translation rules to convert the message into a form usable by the second device and by referencing interaction rules to determine that the second device should be contacted. For example, according to the translation rules, an initial "1" tone from the remote device may indicate that the oven should be contacted, and a subsequent "2" tone from the remote device may indicate that the oven should cancel any automatic preheating for the day.

Thus, translate operation 2006 involves determining the second device to communicate with through detecting an ID of the second device from the message of the remote device at ID operation 2020. In the example above, the ID of the oven is an initial "1" tone. The first device receives the "1" tone and references a "1" tone in the interaction rules to determine that a message should be sent to the oven. The first device receives the "2" tone and, knowing that the message is for the oven, references a "2" tone for the oven in the translation rules to determine that a cancel preheat message to the oven is necessary. The message is communicated from the first device to the second device at communication operation 2008.

The second device receives the message and implements the instruction at implementation operation 2010. For the example above, the oven receives a message instructing it to cancel its pre-programmed preheat operation for the day, and it cancels the preheat operation accordingly. As an exemplary option to the logical operations, the second device may then send a message back to the first device confirming it has implemented the instruction at send operation 2012.

The first device 2014 receives the message from the second device at receive operation 2014, and then the first device 2014 translates the confirmation to a message that can be sent to the notification device at translate operation 2016 in the instance where the notification device is external. For example, the first device 2014 may determine from the translation rules that it should send a pattern of tones to the telephone used to place the call to signal to the user that the oven canceled the preheat operation. The first device 2014 then communicates the message to the remote notification device over the remote communication transport at communication operation 2018 to complete the notification communications.

The user may be provided a user interface to interact directly with devices of the environment such as the aggregator. As discussed above, the user may program interaction rules, translation rules, and hierarchies for remote communication through the user interface. Additionally, the user may review information about the device environment through the user interface, such as current states of devices and existing interaction rules and translation rules of the environment.

Figure 21:
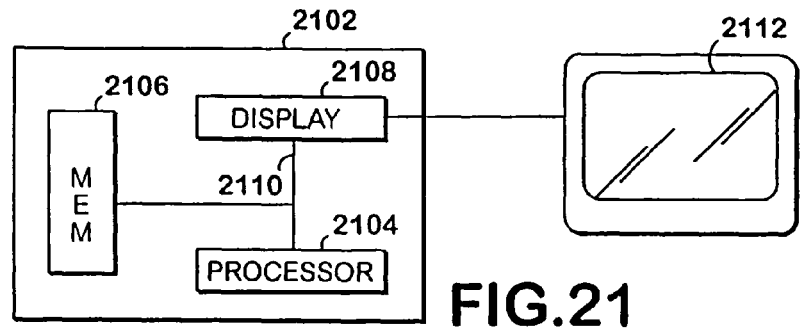
FIG. 21 is a diagram of an embodiment of a device for providing a display of information about a device environment.

FIG. 21 shows the major components of an exemplary device 2102 establishing a user interface for the device environment. The user interface 2102 may be a separate device or may be incorporated into a device of the environment such as an aggregator. The user interface 2102 includes a processor 2104 for implementing logical operations of the user interface. The processor 2104 communicates with a memory 2106 and a display adapter 2108 through a bus 2110. The processor 2104 references the rules stored for the environment in the memory 2106 to provide information to the user on a display screen 2112 driven by the display adapter 2108.

The user interface 2102 may provide several mechanisms for receiving user input. As shown, a touchscreen 2112 is provided so that the user can make selections and enter information by touching the screen 2112 that displays selectable items such as text or icons. One skilled in the art will recognize that other user input devices are equally suitable, such as but not limited to a keyboard and mouse.

Several exemplary screenshots of the user interface are shown in FIGS. 22-25. The screenshots demonstrate a graphical user interface that is icon based. However, other forms of a user interface on screen 2112 are also suitable, such as a text-based user interface. Furthermore, many variations on the graphical user interface shown are possible.

Figure 22:
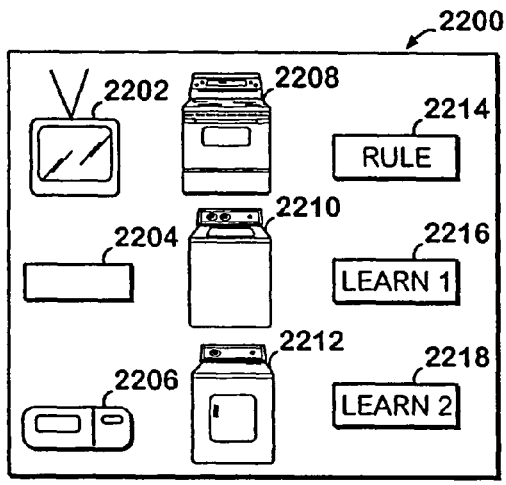
FIG. 22 is an exemplary screenshot of the device of FIG. 21 that illustrates a device menu and a learn mode menu.

FIG. 22 shows a screenshot 2200 that contains icons that form representations of the devices present within the environment. As shown, six devices are present within the environment and the screenshot 2200 includes a television representation 2202, a VCR representation 2204, a microwave representation 2206, a stove/oven representation 2208, a washer representation 2210, and a dryer representation 2212. Also included in the screenshot 2200 are a rule button 2214, a first learn mode button 2216, and a second learn mode button 2218.

From screenshot 2200, the user may make a selection of a device representation to learn information about the device such as its current state. The logical operations of viewing device information are discussed in FIG. 27. The selection may also be used to send an instruction to the device to immediately bring about a state change as may be done with an ordinary remote control. The user may select the rule button 2214 to view interaction or translation rules already stored and being executed for the environment. An example of viewing existing rules is discussed in more detail with reference to FIG. 25.

The user may also make a selection of the first learn mode button 2216 to program an interaction or translation rule by interacting with device representations and function representations for the device. The first learn mode is discussed in more detail with reference to FIG. 23 and the logical operations of FIG. 28. Additionally, the user may make a selection of the second learn mode button 2218 to program an interaction rule by interacting with the device itself. The second learn mode is discussed in more detail with reference to FIG. 24 and the logical operations of FIG. 26.

Figure 23:
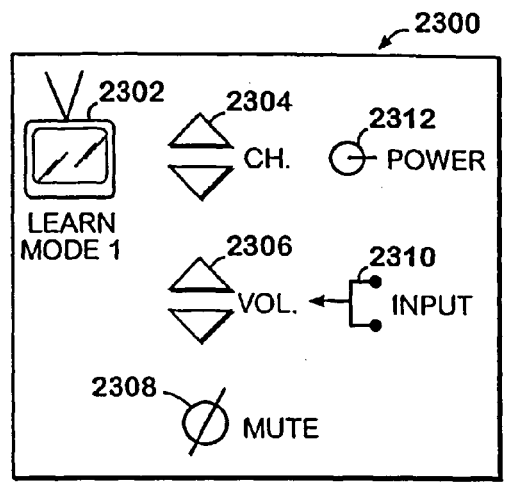
FIG. 23 is an exemplary screenshot of the device of FIG. 21 that illustrates a learn mode allowing the user to select function representations on the screen to associate functions of devices.

FIG. 23 shows a screenshot 2300 after a user has selected the TV representation 2202 from the initial screenshot 2200. The screenshot 2300 shows the device representation or icon 2302 and the associated function representations or icons for the functions of the TV present in the environment. The function representations include channel selection representation 2304, volume selection representation 2306, mute representation 2308, power representation 2312, and signal input representation 2310. The user makes a selection of a particular function representation to be associated in an interaction rule and then selects another function representation of the TV or another device to complete the rule.

As described above, the user may select a power on representation for the VCR and then select the channel selection representation 2304 to indicate a channel 3 for the TV. The interaction rule is created as a result so that whenever the VCR is powered on, the TV automatically tunes to channel 3. The interaction rule may be programmed to include additional associations as well, such as setting the TV volume representation 2306 to a particular volume setting as well once the VCR is powered on. Likewise, rules may be specified for a single device, such as for example specifying that when the TV is turned on, the volume of the TV should automatically be set to a particular level.

Figure 28:
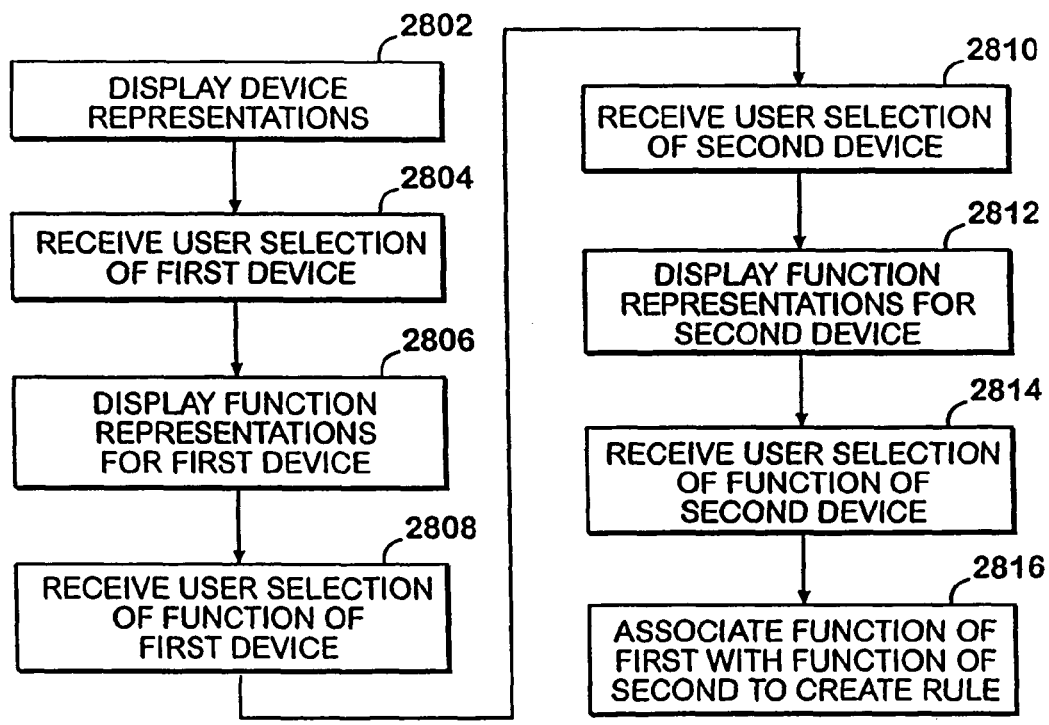
FIG. 28 is an exemplary operational flow of a learn mode where the user selects function representations on a display screen to associate functions of devices.

The logical operations for the first learn mode are shown in FIG. 28. The logical operations begin by the user interface displaying the device representations at display operation 2802. A user selection of a first device selection is selected at input operation 2804. The function representations of the first device are displayed on the screen for the first device at display operation 2806. A user selection of a function representation for the first device is received at input operation 2808.

The device selections are redisplayed and the user selects a second device representation at input operation 2810. The function representations of the second device are displayed at display operation 2812. A user selection of a second device selection for the second device is received at input operation 2814. The function representation selected for the first device is associated with the function representation for the second device to create the interaction rule at rule operation 2816.

Figure 24:
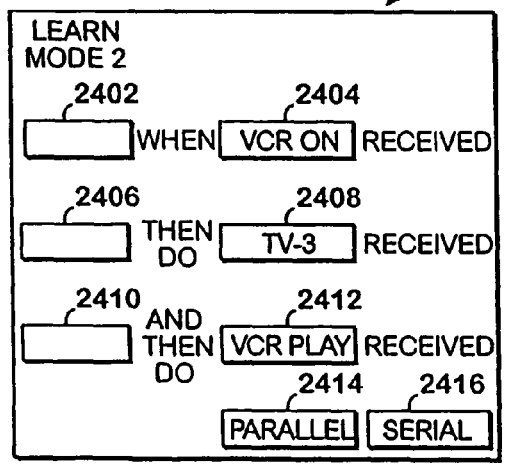
FIG. 24 is an exemplary screenshot of the device of FIG. 21 that illustrates a learn mode allowing the user to select functions on devices that are to be associated.

FIG. 24 shows a screenshot 2400 that is displayed after a user selects the second learn mode button 2218. The screenshot 2400 includes a button 2402 that is a choice to learn a first portion of the interaction rule. The user presses the button 2402 and then selects the first function on the first device itself within the environment. In response to the first device providing a message about its resulting state change, the selected function is displayed in field 2404.

The user then presses the button 2406 that is a choice to learn a second portion of the interaction rule. The user selects the second function on the second device itself, and in response to the second device providing a message about its state change, the selected function is displayed in field 2408.

The interaction rule is created by associating the function shown in the first display field 2404 with the function shown in the second display field 2408. In the example shown, the rule that results is if the VCR is powered on (a first received state change message), then the TV tunes to channel 3 (a second received state change message).

The development of the rule may continue as well. The user may press the button 2410 that is a choice to learn a third portion of the interaction rule. The user selects the third function on the third device itself, and in response to the third device providing a message about its state change, the selected function is displayed in filed 2412. In the example shown, the rule that results is if the VCR is powered on, then the TV tunes to channel 3 and then the VCR begins to play. Additionally, as discussed above in relation to advanced interaction rules of the aggregator, the user may specify via buttons 2414, 2416 whether the execution of the multiple step interaction rule should be performed in parallel or serial fashion. If in parallel, then turning the VCR on causes messages to be simultaneously instructing the TV to tune to channel 3 and the VCR to begin playing simultaneously. If in series, then the TV is instructed to turn on prior to the VCR being instructed to play.

Figure 26:
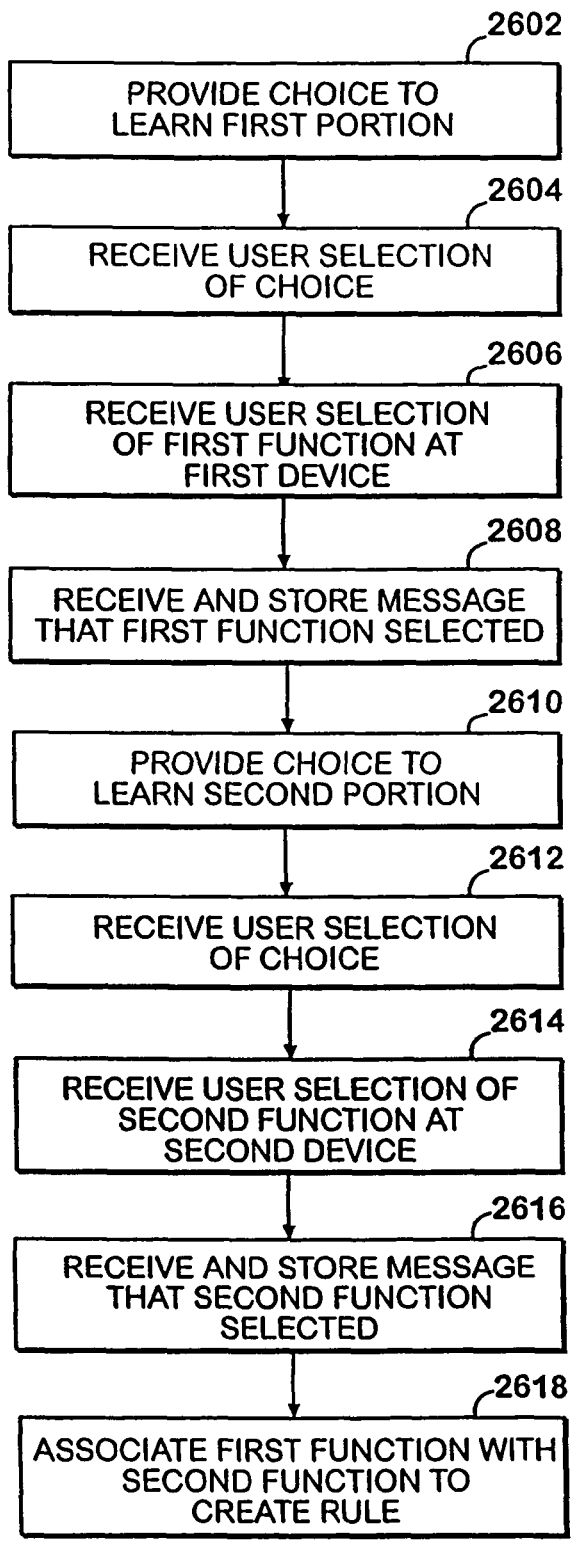
FIG. 26 is an exemplary operational flow of a learn mode where the user selects functions on the devices that are to be associated.

The logical operations of an example of the second learn mode are shown in FIG. 26. The logical operations begin at choice operation 2602 where the first choice is provided to the user for selection to initiate learning of the first portion of the interaction rule. The user selects the first choice, which is received at input operation 2604. The user then selects the first function on the first device itself at input operation 2606. A state change message from the first device is received at the device creating the rule at receive operation 2608, and the message indicates the function the user selected. The function description is stored in memory.

The second choice is provided to the user for selection to initiate learning of the second portion of the interaction rule at choice operation 2610. The user then selects the choice at input operation 2612 to initiate learning of the second portion of the interaction rule. The user then selects the second function representation on the second device at input operation 2614. A state change message is received from the second device at the device creating the rule at receive operation 2616, and the message indicates the function the user selected. The function description is stored in memory. Once the two function descriptions are known by the device creating the rule, the first function description is associated with the second function description at rule operation 2618 to create the reaction rule.

Figure 25:
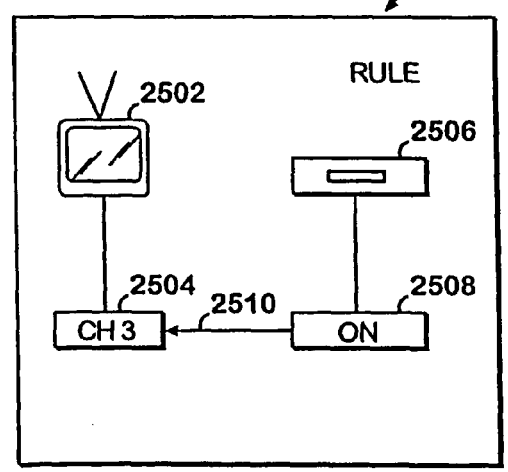
FIG. 25 is an exemplary screenshot of the device of FIG. 21 that illustrates a rule display mode for visually conveying the stored rules to a user.

FIG. 25 shows a screenshot 2500 that results from the user selecting the rule button 2214 and a selection of a device that is involved in the rule. For example, the user may select the TV representation 2202 to view an interaction rule involving the TV present in the device environment. A TV representation 2502 is displayed and is connected to a function representation 2504 that indicates that the TV is being tuned to channel 3. A VCR representation 2506 is displayed and is connected to a function representation 2508 that indicates that the VCR is being powered on.

A connector 2510 is shown connecting the VCR function representation 2508 to the TV function representation 2504. As shown, the connector 2510 is directional as an arrowhead points to the TV function representation 2504 to indicate that the TV function results from the VCR function. The corresponding interaction rule provides the association of VCR on to TV channel 3 only to automatically control the TV in response to the VCR but not the other way around. Thus, when the TV is tuned to channel 3 by the user, the VCR does not automatically turn on because the interaction rule is learned as a directional association.

Other interaction rules may involve a connector that is not directional so that the association is absolute rather than directional. For example, it may be preferred that the VCR automatically turn on when the TV is tuned to channel 3 and that the TV automatically tune to channel 3 when the VCR is turned on. Such an interaction rule would be absolute rather than directional, and the connector 2510 would lack an arrowhead or alternatively have arrowheads pointing in both directions. One skilled in the art will recognize that other visual connectors besides arrowheads and lines are suitable as well.

To view information about a specific device in the environment, the user may select the device representation from the screenshot 2200 of FIG. 22. A screenshot such as the screenshot 2300 of FIG. 23 will be displayed. Along side each function representation, the value for that function may be displayed to inform the user of the current state of the device. For example, a 3 may appear next to the channel representation 2304 while a checkmark appears next to the mute representation 2308 to indicate that the TV is currently tuned to channel 3 but is muted.

Figure 27:
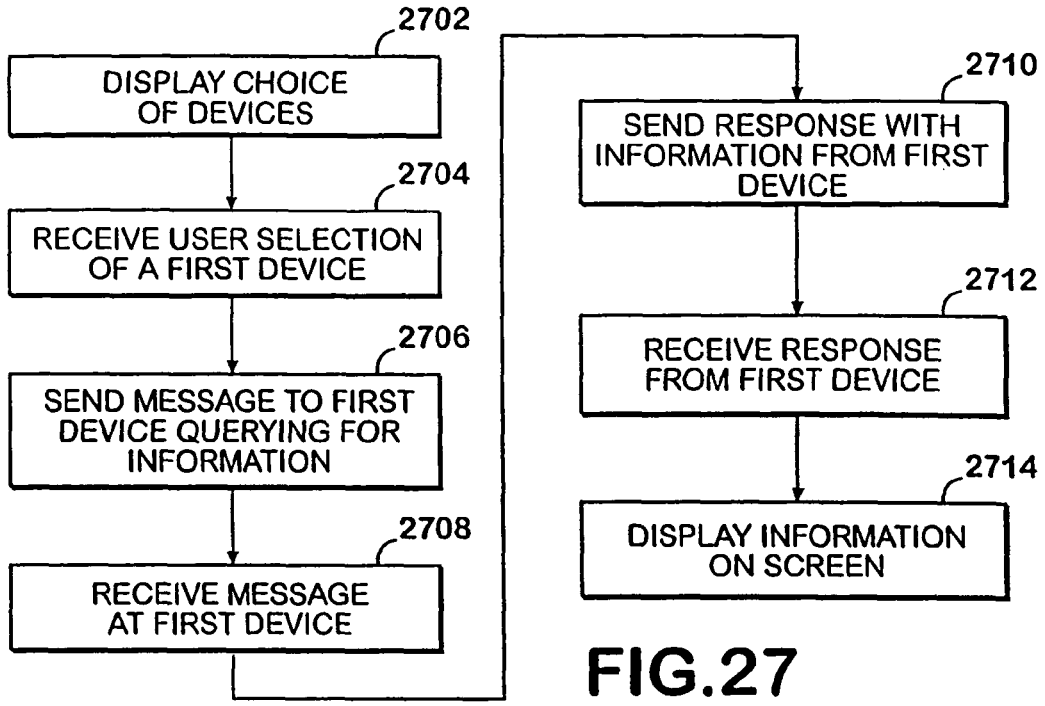
FIG. 27 is an exemplary operational flow of a device information display mode.

The logical operations for obtaining information about a device through the device interface are shown in FIG. 27. The logical operations begin by displaying a choice of device representations at display operation 2702. A user selection of a device representation is received at input operation 2704 to select a first device. A message is then sent from the user interface, such as an aggregator, to the first device selected by the user at send operation 2706. The message includes a request for information, such as the current status, from the first device.

The first device receives the request for information at receive operation 2708. The first device then directs a reply back to the user interface at send operation 2710. The reply is a response to the request for information and includes the current status information of the first device. The user interface device receives the reply from the first device at receive operation 2712, and then the user interface displays the current status information on the screen at display operation 2714.

Various embodiments of devices and logical operations have been discussed above in relation to communications between devices, automatic and manual learning of interaction rules, content control, aggregator functions, remote communications, and a user interface. Although these embodiments of devices and logical operations may be combined into a robust system of device interaction, it should be noted that various devices and logical operations described above may exist in conjunction with or independently of others.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. An aggregator in a multiple device environment, the aggregator comprising:
    a receiver receiving a change of state from one device of a plurality of devices;
    memory storing interaction rules for the plurality of devices;
    a processor communicating with the receiver and the memory, the processor querying the interaction rules for the change of state and retrieving a rule associated with the change of state, the processor interpreting the rule to require a broadcast of the change of state to the plurality of devices;
    a list stored in the memory, the list defining impermissible associations between devices among the plurality of devices, the impermissible associations related to inappropriate rules to be excised by the processor; and
    a transmitter in communication with the processor, the processor instructing the transmitter to broadcast the state of change to the plurality of devices,
    wherein the aggregator disseminates the change of state of the one device to the plurality of devices.

2. The aggregator of claim 1, wherein the transmitter and the receiver are configured to communicate using at least one of frequency division multiplexing, time division multiplexing, code division multiplexing, and optical multiplexing.

3. The aggregator of claim 1, further comprising a state sensor to detect states from the plurality of devices.

4. The aggregator of claim 1, wherein the processor separates the plurality of devices into classes.

5. The aggregator of claim 4, wherein a first device in a first class only affects devices in the first class.

6. The aggregator of claim 4, wherein class rules are stored by the memory.

7. The aggregator of claim 1, wherein the processor is configured to develop rules based on conditional logic.

8. The aggregator of claim 1, wherein the interaction rules are performed in series.

9. The aggregator of claim 1, wherein the interaction rules are performed in parallel.

10. The aggregator of claim 1, wherein the processor is configured to translate among different communication transports.

11. The aggregator of claim 1, wherein the transmitter and the receiver are combined as a transceiver.

12. A method of device interaction, the method comprising:
    receiving a change of state at a receiver of an aggregator, the change of state sent from one device in a network of a plurality of devices;
    storing interaction rules for the plurality of devices in memory of the aggregator;
    defining impermissible associations in the interaction rules between devices among the plurality of devices, the impermissible associations related to inappropriate rules to be excised by a processor;
    querying the interaction rules for the change of state;
    retrieving a rule associated with the change of state;
    interpreting the rule by the aggregator to require a broadcast of the change of state from the aggregator to the plurality of devices; and
    broadcasting the state of change from a transmitter to the plurality of devices,
    wherein the aggregator disseminates the change of state of the one device to the plurality of devices.

13. The method of claim 12, further comprising broadcasting the change of state using at least one of frequency division multiplexing, time division multiplexing, code division multiplexing, and optical multiplexing.

14. The method of claim 12, further comprising detecting states of the plurality of devices.

15. The method of claim 14, further comprising defining the interaction rules according to changes in state within a period of time.

16. The method of claim 12, further comprising separating the plurality of devices into classes.

17. The method of claim 12, further comprising developing the interaction rules based upon conditional logic.

18. The method of claim 12, further comprising determining whether a destination device among the plurality of devices requires a translation of the change of state.

19. A non-transitory computer readable medium storing processor executable instructions for performing a method, the method comprising:
- receiving a change of state at a receiver of an aggregator, the change of state sent from one device in a network of a plurality of devices;
- storing interaction rules for the plurality of devices in memory of the aggregator;
- defining impermissible associations in the interaction rules between devices among the plurality of devices, the impermissible associations related to inappropriate rules to be excised by a processor;
- querying the interaction rules for the change of state;
- retrieving a rule associated with the change of state;
- interpreting the rule by the aggregator to require a broadcast of the change of state from the aggregator to the plurality of devices; and
- broadcasting the state of change from a transmitter to the plurality of devices,
- wherein the aggregator disseminates the change of state of the one device to the plurality of devices.

* * * * *